(12) United States Patent
Dobson et al.

(10) Patent No.: US 7,636,697 B1
(45) Date of Patent: Dec. 22, 2009

(54) METHOD AND SYSTEM FOR RAPID EVALUATION OF LOGICAL EXPRESSIONS

(75) Inventors: Daniel Dobson, Atherton, CA (US); John Funge, Sunnyvale, CA (US); Charles Musick, Belmont, CA (US); Stuart Reynolds, Palo Alto, CA (US); Xiaoyuan Tu, Sunnyvale, CA (US); Ian Wright, Mountain View, CA (US); Wei Yen, Los Altos Hills, CA (US)

(73) Assignee: AiLive Inc., Mountain View, CA (US)

( * ) Notice: Subject to any disclaimer, the term of this patent is extended or adjusted under 35 U.S.C. 154(b) by 474 days.

(21) Appl. No.: 11/699,201

(22) Filed: Jan. 29, 2007

(51) Int. Cl.
*G06F 15/18* (2006.01)

(52) U.S. Cl. ........................................................ 706/12
(58) Field of Classification Search ................. 706/12
See application file for complete search history.

(56) References Cited

U.S. PATENT DOCUMENTS

| | | | |
|---|---|---|---|
| 5,175,856 A * | 12/1992 | Van Dyke et al. | 717/151 |
| 5,343,554 A * | 8/1994 | Koza et al. | 706/13 |
| 5,742,738 A * | 4/1998 | Koza et al. | 706/13 |
| 5,778,157 A | 7/1998 | Oatman et al. | |
| 5,841,663 A * | 11/1998 | Sharma et al. | 716/18 |
| 5,892,947 A * | 4/1999 | DeLong et al. | 717/100 |
| 5,995,955 A | 11/1999 | Oatman et al. | |

(Continued)

FOREIGN PATENT DOCUMENTS

| | | |
|---|---|---|
| WO | WO 2006/014560 A2 | 2/2006 |
| WO | WO 2006/015234 A2 | 2/2006 |

OTHER PUBLICATIONS

A recursively structured solution for handwriting and speech recognition Lin, I.-J.; Kung, S.Y.; Multimedia Signal Processing, 1997., IEEE First Workshop on Jun. 23-25, 1997 pp. 587-592 Digital Object Identifier 10.1109/MMSP.1997.602698.*

(Continued)

*Primary Examiner*—Michael B Holmes
(74) *Attorney, Agent, or Firm*—Joe Zheng

(57) ABSTRACT

Methods and systems capable of determining which subset of a set of logical expressions are true with relatively few evaluations of the primitives that, together with any standard logical connectives, make up the logical expressions. A plurality of directed acyclic graphs, each graph including at least one root node, at least one leaf node, and at least one non-leaf node associated with a leaf node. Each node is associated with a, possibly empty, subset of presumed to be true logical expressions. Each non-leaf node is associated with one of the primitives mentioned in any of the logical expressions. Edges are defined between two of the nodes, each edge being associated with a possible value, or range of possible values, of the primitive associated with the node at the tail of the edge. Paths are defined through each of the directed acyclic graphs from a root node to a leaf node by recursively following each edge corresponding to the current value of the primitive at a selected non-leaf node. Lastly, subsets of logical expressions associated with the nodes on the defined paths are collated to yield a subset of logical expressions that are true.

35 Claims, 24 Drawing Sheets

Overview.

U.S. PATENT DOCUMENTS

| | | | |
|---|---|---|---|
| 6,058,385 A * | 5/2000 | Koza et al. ................ 706/13 |
| 6,085,029 A * | 7/2000 | Kolawa et al. ............. 714/38 |
| 6,192,338 B1 | 2/2001 | Hazsto et al. |
| 6,216,014 B1 | 4/2001 | Proust et al. |
| 6,363,384 B1 | 3/2002 | Cookmeyer, II et al. |
| 6,389,405 B1 | 5/2002 | Oatman et al. |
| 6,425,582 B1 | 7/2002 | Rosi |
| 6,467,085 B2 | 10/2002 | Larsson |
| 6,477,553 B1 | 11/2002 | Druck |
| 6,539,337 B1 * | 3/2003 | Provan et al. ............ 702/183 |
| 6,561,811 B2 | 5/2003 | Rapoza et al. |
| 6,636,860 B2 | 10/2003 | Vishnubhotla |
| 6,640,231 B1 | 10/2003 | Andersen et al. |
| 6,789,054 B1 * | 9/2004 | Makhlouf ................. 703/6 |
| 6,892,349 B2 | 5/2005 | Shizuka et al. |
| 6,912,700 B1 * | 6/2005 | Franco et al. ............. 716/5 |
| 7,054,928 B2 | 5/2006 | Segan et al. |
| 7,257,802 B2 * | 8/2007 | Daw et al. ................ 716/18 |
| 7,380,224 B2 * | 5/2008 | Franco et al. ............. 716/4 |
| 7,584,079 B2 * | 9/2009 | Lichtenberg et al. ........ 703/2 |
| 7,587,379 B2 * | 9/2009 | Huelsman et al. .......... 706/47 |
| 2002/0165839 A1 | 11/2002 | Taylor et al. |
| 2003/0041040 A1 | 2/2003 | Bertrand et al. |
| 2003/0084015 A1 | 5/2003 | Beams et al. |
| 2004/0010505 A1 | 1/2004 | Vishnubhotla |
| 2006/0036398 A1 | 2/2006 | Funge et al. |

OTHER PUBLICATIONS

An UpDown Directed Acyclic Graph Approach for Sequential Pattern Mining Chen, J; Knowledge and Data Engineering, IEEE Transactions on : Accepted for future publication vol. PP, Forthcoming, 2009 pp. 1-1 Digital Object Identifier 10.1109/TKDE.2009.135.*

Hierarchical Dependence Graphs for Dynamic JDF Workflows Tong Sun; Walker, J.; Systems, Man and Cybernetics, 2006. SMC '06 IEEE International Conference on vol. 4, Oct. 8-11, 2006 pp. 2747-2752 Digital Object Identifier 10.1109/ICSMC.2006.385289.*

Supporting Distributed Application Workflows in Heterogeneous Computing Environments Qishi Wu; Yi Gu; Parallel and Distributed Systems, 2008. ICPADS '08. 14th IEEE International Conference on Dec. 8-10, 2008 pp. 3-10 Digital Object Identifier 10.1109/ICPADS.2008.40.*

* cited by examiner

Figure 1: Overview.

Figure 2: Preferred Embodiment.

Figure 3: Example Logical Expressions from the Preferred Embodiment.

Figure 4: Abstract Example of Logical Expressions.

Figure 5: (Prior Art) Naïve Tree.

Figure 6: Simple Feature Tree.

Figure 11: moveTargetPred1-nearestEnemy-39-1-Flat.

METHOD AND SYSTEM FOR RAPID EVALUATION OF LOGICAL EXPRESSIONS

BACKGROUND OF THE INVENTION

The academic field of machine learning studies algorithms, systems and methods for learning associations between inputs and outputs. The exact nature of the inputs, algorithms and outputs depend upon the domain of an application.

The inputs to a machine learning algorithm are typically referred to as features or attributes. It is often desirable to make learning algorithms operate as quickly as possible. In particular, in real-time or in near real-time. Sometimes, a major obstacle to achieving faster performance is computing the values of some of the input features.

In a preferred embodiment, machine learning is applied to computer games and the inputs to the learning typically include features that characterize the current game situation in which a game character finds itself. For example, there is the game character under attack by a nearby enemy and it is now low on health, or in contrast, the game character in question full of health and heading toward a large tree. Another kind of input feature that is useful for certain problems is features that characterize certain objects. For example, a game character may need to know the identity of the most dangerous enemy within an attack range, as well as the identity of the nearest enemy with a sword. In both cases, an important class of input features called Boolean-valued input features is common and important.

Boolean-valued input features are features that can be either true or false. Boolean-valued input features are usually defined by a logical expression comprised of one or more dependent features composed together using any standard logical operators such as "and" (&&), "or" (||), "not" (!), equality (==), less than (<), less than or equal to (<=), greater than (>), greater than or equal to (>=), not equal to (!=) and parentheses. The dependent features are sometimes referred to by the inventors as the primitives.

Boolean-valued input features represent one example of how the need to rapidly evaluate sets of logical expressions occurs naturally within the context of machine learning. But in many other sub-fields of artificial intelligence (AI), as well as other areas such as electronic circuits, the need to rapidly evaluate sets of logical expressions is commonplace.

SUMMARY OF THE INVENTION

The invention provides techniques, including methods and systems, capable of determining which subset of a set of logical expressions are true with relatively few evaluations of the primitives, that together with any standard logical connectives, make up the logical expressions. In one preferred embodiment, the invention defines a set of input features to some machine learning algorithm, each said input feature defined by a separate logical expression. The logical expression is typically constructed from logical connectives, relational operators, parentheses and primitives. The truth or falsity of each logical expression is determined by the current values of the primitives and the standard rules of mathematical logic. The semantics of each of the primitives is determined by the particular application in question. For example, in one application a primitive "temperature" might reflect the current temperature of some chemical reaction being monitored. In another application, a primitive with the same name might reflect the last broadcast temperature in the Bahamas. Primitive values typically change over time. When the value of a primitive changes, any logical expression that mentions that primitive may, depending on its structure, change too. For example, the input feature "isCold" might be represented by the logical expression "temperature<0". In which case, if the temperature drops from the 5 degrees to −3 degress, then the input feature "isCold" will change from being false to true. Whereas if the temperature where to rise from 7 degrees to 9 degrees, then the input feature "isCold" would remain unchanged; in particular its value would remain false. The invention also defines a plurality of directed acyclic graphs, each graph including at least one root node, at least one leaf node, and at least one non-leaf node associated with a leaf node. Each node is associated with a, possibly empty, subset of presumed to be true logical expressions of the set of logical expressions. Each non-leaf nodes is associated with one of the primitives mentioned in any of the logical expressions. Edges are defined between two of the nodes, each edge being associated with a possible value, or range of possible values, of the primitive associated with the node at the tail of the edge. Paths are defined through each of the directed acyclic graphs from a root node to a leaf node by recursively following each edge corresponding to the current value of the primitive at a selected non-leaf node. Lastly, subsets of logical expressions associated with the nodes on the defined paths are collated to yield a subset of logical expressions that are true.

The inventors have discovered that even large sets of logical expressions often only mention a relatively small number of primitives. That is, the same primitives typically show up again and again in many different logical expressions. They noticed that using prior art to determine the subset of true logical expressions resulted in some of the primitives being repeatedly evaluated an enormous number of times. For example, in the worst case, a primitive might have to be evaluated once for each mention in each logical expression. With thousands of occurrences of primitives in thousands of logical expressions, the cost of repeatedly evaluating the primitives was a major bottleneck. The inventors have therefore invented a method, a system, or a computer program that takes advantage of the relatively small number of primitives to represent a large set of logical expressions as a set of directed acyclic graphs. The inventors sometimes refer to the data structure that represents the set of directed acyclic graphs as a forest of feature trees. Using the set of directed graphs, the subset of true logical expressions can be determined with significantly fewer repeated evaluations of the primitives. In particular, the subset of true logical expressions is determined quickly by following paths in the graphs, as determined by the values of the primitives. In one preferred embodiment, this allows them to remove a major bottleneck in their ability to operate machine learning algorithms in real-time, or near real-time.

Machine learning is used in a wide variety of applications that includes robotics, data mining, online analytical processing (OLAP), circuit design and drug discovery. In one preferred embodiment, the application is to learn in real-time, or near real-in computer games. In particular, the output of the learning includes a prediction about how a game character would behave if a human player, sometimes referred to as the trainer, controls it. The prediction about how the trainer would behave can include predictions about which direction the trainer would move and at what speed, or predictions about which action the trainer would pick, or how long the trainer would continue performing an action had they previously picked it. The prediction is typically used to drive the behavior of a non-player character (NPC) such that the NPC behaves in a manner or style that is ostensibly similar to the recent behavior of a human trainer In one preferred embodiment, the logical expressions are obtained as the union of the logical expressions that define the tests in a collection of specialists from some learning element. The effect of rapidly computing a subset of true logical expressions is to rapidly determine a context and a corresponding set of active experts. With a suitable supplied training signal that specifies the desired response in a given, or similar context, the learning element can determine context-dependent weights associated with each expert. Such that, when the learning element finds itself in the same, or a similar context, the weighted suggestions from the active experts can be used to determine a response that would be the same, or similar, to the response expected from the provider of the original training signal.

In one preferred embodiment, context learning is used to enable an NPC in a video game to learn the play style of a human player. The set of specialists are specified in relation to a specific learning task. For example, learning the discrete action to choose, the direction to move and the speed to move are all treated as separate learning problems. That is, for each of these three tasks there is a separate set of specialists relevant to determining the context.

The inventors have discovered that a significant cost of the overall learning task is the determination of the current context. Therefore, completing this step as fast as possible is vital if learning is to take place in real-time or near real-time. The current invention is therefore an important enabling technology. For example, by using one embodiment of the invention to compute the value of those Boolean-valued input features, the inventors are able to remove a major bottleneck in the their ability to enable an NPC to learn how to play a computer game in a real-time, or near real-time, from a human trainer.

Another application of the invention in one preferred embodiment is to select targets. For example, when learning how to move, an NPC observes how a human trainer moves with respect to certain objects. That is, the trainer might run away from enemy characters when low on health and toward them otherwise. There can be numerous targets that can be important at any one time. For example, the nearest enemy might be important as well as the nearest enemy with a sword, the nearest enemy with a sword and low health, etc. In particular, there may be a set of targets that are defined by a set of tests that are each defined by some logical expression, those tests used to filter a list of known objects in the game to determine which ones have the properties to qualify them as a particular target. The invention can be used to build a set of feature trees that correspond to the set of tests on the objects. That set of trees being used to identify the set of objects that correspond to the required targets using significantly fewer evaluations of the primitives than required using prior art.

Besides the application to Boolean-valued input features in the field of machine learning algorithms, there are many other AI techniques that require the fast evaluation of a set of logical expressions. The invention is therefore potentially important in those fields as well.

In addition to being implementable using a general-purpose computer, the invention can also be embodied in special purpose hardware. The biggest advantage of implementing the current invention in hardware is that the resulting circuit, for computing the subset of logical expressions that are true, typically requires significantly less gates than circuits resulting from prior art techniques.

BRIEF DESCRIPTION OF THE DRAWINGS

FIGS. 7 through 24 show examples of feature trees, i.e., directed acyclic graphs, that are used in one preferred embodiment. Each graph is used to facilitate rapidly computing a prediction by a computer-controlled character in a video game. In particular, each graph is used rapidly determine which context a computer-controlled character is in.

FIG. 7 shows an example of a graph used to determine the context relevant to deciding which discrete action a human would take.

FIG. 8 shows an example of a graph used to determine the context for deciding which direction a human would move.

FIG. 9 shows an example of a graph used to determine the context for deciding which direction a human would move when there is no enemy present.

FIGS. 10-15 show an example of a set of graphs are used in concert to determine the context for deciding which direction a human would move when there is an enemy present.

FIGS. 16-18 show an example of a set of graphs used to determine the context for deciding at what speed a human would move.

FIG. 19 shows the topology of an example of a particularly complicated graph.

FIGS. 20-24 show an example of a set of graphs used to determine the target of an action.

DETAILED DESCRIPTION

Generality of the Description

Figure 1:
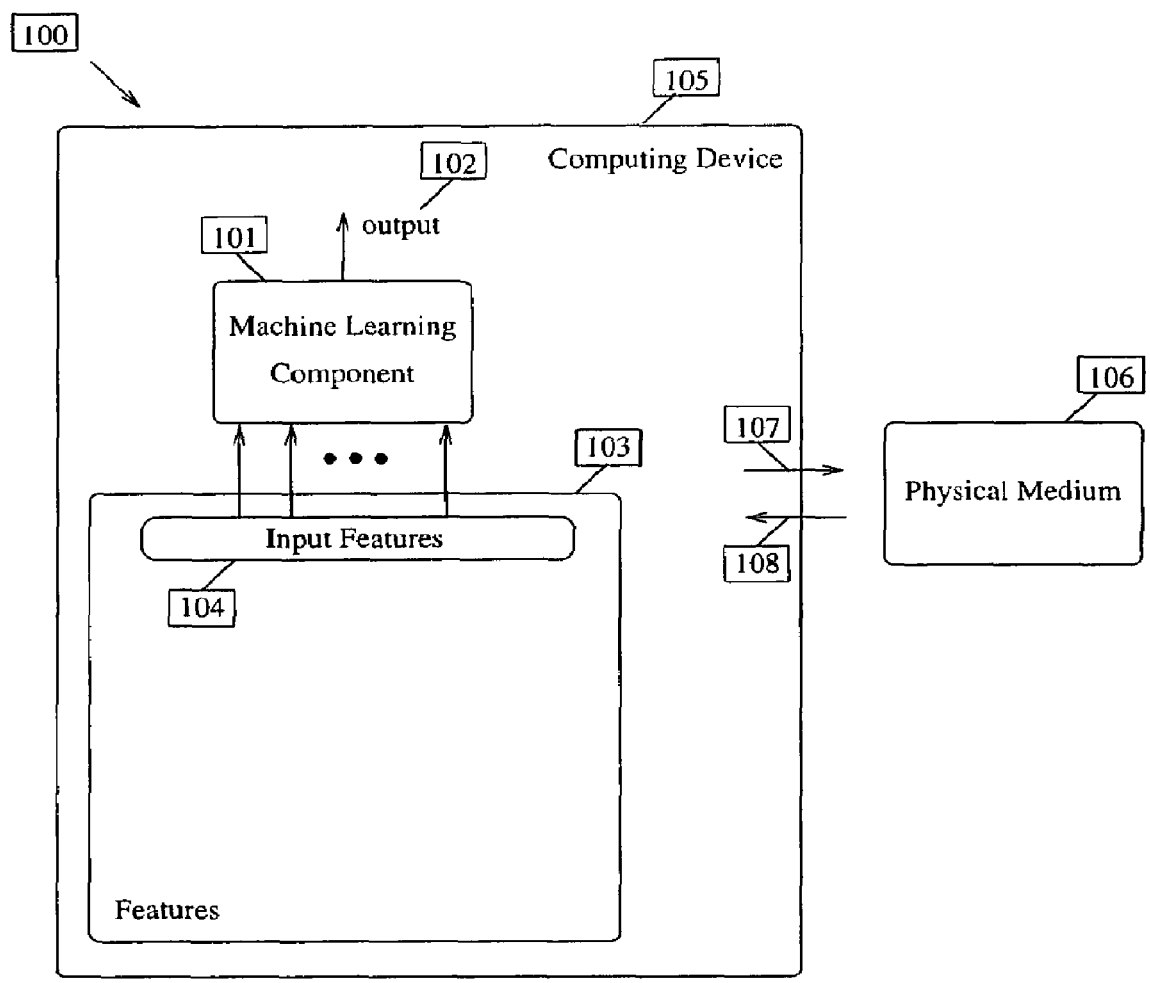
FIG. 1 shows a general overview of features in the context of machine learning.

This application should be read in the most general possible form. This includes, without limitation, the following:

References to specific structures or techniques include alternative and more general structures or techniques, especially when discussing aspects of the invention, or how the invention might be made or used.

References to "preferred" structures or techniques generally mean that the inventor(s) contemplate using those structures or techniques, and think they are best for the intended application. This does not exclude other structures or techniques for the invention, and does not mean that the preferred structures or techniques would necessarily be preferred in all circumstances.

References to first contemplated causes and effects for some implementations do not preclude other causes or effects that might occur in other implementations, even if completely contrary, where circumstances would indicate that the first contemplated causes and effects would not be as determinative of the structures or techniques to be selected for actual use.

References to first reasons for using particular structures or techniques do not preclude other reasons or other structures or techniques, even if completely contrary, where circumstances would indicate that the first reasons and structures or techniques are not as compelling. In general, the invention includes those other reasons or other structures or techniques, especially where circumstances indicate they would achieve the same effect or purpose as the first reasons or structures or techniques.

After reading this application, those skilled in the art would see the generality of this description.

DEFINITIONS

The general meaning of these terms is intended to be illustrative and not limiting in any way.

Feature: Machine learning algorithms typically attempt to learn associations between inputs and outputs. Feature, or attribute, is the name typically given to one of those inputs. As one of the inputs to a learning algorithm, a feature should typically convey information that will be helpful to learning the desired association between inputs and outputs. The types of information that might be helpful vary enormously according to factors such as the algorithm being used and the application area. In one preferred embodiment, features typically convey information about the state of the game that might have been influential in the trainer's decisions about how to behave. For example, information about health, weapons and positions of various important characters are typical examples of features.

Input feature: An input feature is a feature that is supplied directly to some learning algorithm. This is as opposed to a feature that is only used as an intermediate result used to compute the valued of some other feature. That is, computing the values of some input features may, in turn, require the evaluation of many intermediate results, or dependent features. Any dependent feature may also, in turn, require the evaluation of further layers of dependent features. Eventually, the layers of dependent features bottom out in a set of features that don't depend on any other features that are sometimes referred to as raw features.

In a preferred embodiment the outputs of some machine learning processes are the inputs to yet other machine learning processes. In particular, learning components are arranged in hierarchies that reflect the hierarchical nature of the problem. Therefore, input feature must be understood within the context of one learning process within a possible hierarchy of learning processes. Since an input feature to one process may only be helping to compute some output that is just an intermediate result or the input to some other process.

Boolean-valued feature: Boolean-valued features are features that can be either true or false. Or equivalently, 1 or 0. Many other types of features are possible, for example real-valued features. It is also straightforward to use simple relational operators to define a Boolean-valued feature from a non-Boolean valued feature. For example, "speed" might be a real valued feature that can take any real-valued number (less than the speed of light) as a possible value. We can then define a feature "isSlow=speed<10" which is true whenever the speed drops below 10 km/h and false otherwise. In one preferred embodiment the real-valued feature "distance" is broken up into distance rings. For example, three Boolean-valued features might be defined as "inRingClose=distance<=5", "inRingMedium=5<distance && distance<=10" and "inRingFar=10<distance". A convenient shorthand is to simply label the 3 mutually exclusive distance rings as ring 0, ring 1 and ring 2 and to define a primitive called "inWhichRing" which returns 0, 1, or 2 according to the distance.

Logical expression: A logical expression is any well-formed formula that when evaluated has a value of true or false, or equivalently 1 or 0. Logical expressions are used to define Boolean-valued features. Any of the standard logical symbols, such as "and" (&&), "or" (||) and "not" (!), can be used to construct a logical expression. In addition, relational symbols, such as "equality" (==), "inequality" (!=), "less than" (<), "less than or equal to" (<=), "greater than" (>) and "greater than or equal to" (>=) can be used. Parentheses can also be used to group or disambiguate sub-expressions. All other standard mathematical symbols, such as numbers, and functions may also be used. The remaining symbols that appear in a logical expression are sometimes referred to by the inventors as the primitives. For example, in the logical expression "myHealth<5 && nearestEnemyIsAttacking" there are 2 primitives mentioned "myHealth" and "nearestEnemyIsattacking". Depending on the current values of the primitives the expression will be either true or false.

Primitive: A primitive is a feature that appears in a logical expression that typically doesn't have some semantics fixed by the normal rules of logic and mathematics. That is, primitives are typically features whose values are time-varying and whose semantics are determined by the particular application. For example, the primitive "myHealthIsLow" is a feature that might correspond to a comparison of some specified threshold with the number of hit points the character currently making a decision has left. Where the number of hit points might be recorded and maintained by some software component that is responsible for maintaining the state of the game world. In contrast, a feature like an "and" feature has the standard semantics that its value is true if and only if both its conjuncts are true.

Disjunctive Normal Form: In mathematical logic, a logical expression is in disjunctive normal form (DNF) if it is a disjunction of clauses, where each clause is a conjunction of positive or negative literals. Where a positive literal is an expression that does not contain any "and" (&&) symbols, any "or" (||) symbols, or any "not" (!) symbols. A negative literal is the negation of a positive literal. Any logical expression can typically be converted to DNF.

Feature evaluation: When the value of a feature is determined the inventors sometimes say that it is evaluated, computed or calculated. Sometimes evaluating a feature involves lots of actual calculation and sometimes it does not. For example, in one preferred embodiment, computing the value of a feature might simply involve accessing a value represented in some existing data-structure within the game. For instance, the amount of the character's remaining health is probably represented as a value that can be quickly and easily accessed. But the nearest enemy character that is attacking would typically not be explicitly represented elsewhere. Computing the feature's value therefore might involve iterating through a data-structure that holds a list of all the game characters to filter out the character's that are not enemies and are not visible. Where determining visibility information often involves complex geometric calculations. Of the remaining enemy characters, distances to each of the characters may have to be computed to discover which one is closest. Even if evaluating a feature required a lot of computation, subsequent evaluations might not. For example, if we need to subsequently evaluate a feature that has already been evaluated, for example in some other logical expression, then if we cache the result of the first evaluation we could skip additional calculation. So if we cache a previously calculated value, subsequent evaluations can be much cheaper. Obviously, a cached value can only be used provided the feature's value can be expected to not have significantly changed. In one preferred embodiment cached feature values are invalidated by events such as moving to a new frame or changing the point of view from which decisions are being made. Although for some really expansive features, like nearestEnemy, caches are sometimes re-loaded from a secondary cache to avoid recalculating. Even though using caching typically reduces a lot of calculation, the inventors have discovered that prior art methods of determining a subset of true logical expressions still typically require an overwhelming number of evaluations. Even if caching is used, simply looking up values in a cache still incurs a significant computational expense. Reducing the number of evaluations is therefore crucially important and caching can only help to make each evaluation potentially faster. It is, of course, the invention itself that is designed to reduce the overall number of evaluations.

Expert: An expert is a term used in one preferred embodiment to refer to a subroutine that can be queried to suggest a particular action, behavior or course of action. The decision-making entity may or may not take the expert's advice. Or it may combine the advice with other experts. In one preferred embodiment, the decision-making entity learns which experts to pay attention to by assigning them weights. The weights assigned to each expert change over time and reflect a combination of some measure or how good an advice of the expert has been in the past and how good the advice is expected to be in the future. It should be noted that the term "expert" is used herein in a largely unrelated and entirely different sense to the term "expert system" which is sometimes used in AI.

Test. A test just refers to some logical expression that is either true or false. In one preferred embodiment, a test is associated with a set of specialists and is some Boolean-valued feature that is typically a test on the state of the game world.

Specialist: A specialist is an expert paired with a test, such that whenever the test is determined to be true, the expert is said to be active. In any given situation, a set of experts will typically be active and each expert is as described in the definition of an expert. The result is that the weights assigned to experts used in specialists can be contingent on the context. Note that, more than one specialist may share the same test so that if that test is determined to be true, all the experts with that test are said to be active. Of course, more than one specialist can also share the same type of expert, but if an expert has internal state, each instance of an expert may need to be separate. In one preferred embodiment, each unique test is given an identifier, such that a set of specialists can be associated with each identifier. The subset of unique tests that are true are called the set of active unique tests (AUTs) and, in turn, identify a subset of active experts.

Context: A context is the set of tests that are currently determined to be true. That is, the context determines, as far as possible given the level of abstraction, the current state of the environment.

Unique Test: A collection of tests may possibly contain duplicates. A unique test is simply an identifier associated with each unique test. For example, in one preferred embodiment, if we have 20 tests, only 15 of which are unique, then each unique test is assigned a different numeric identifier in the inclusive range 0 to 14.

Active Unique Test: In one preferred embodiment, if a test is true, then any associated experts will sometimes be said to be active. As convenient shorthand, we may sometimes refer to the test itself as active. In which case, all that is meant is that the test is true. An active unique test (AUT) therefore simply refers an identifier for one of the unique tests that is true. Each node of a feature tree has a (possibly empty) list of AUTs associated with it. These associated AUTs are a list of identifiers of all those unique tests that must additionally be known to be true if the path through the tree passes through the given node. Using this terminology, the invention is a method and system for rapidly determining the set of all active unique tests (AUTs). The union of all the AUTs along the paths through each of the feature trees is precisely that set of all AUTs.

Graph: Informally speaking, a graph is a set of objects called nodes or points or vertices connected by links called lines or edges. In a graph proper, which is by default undirected, a line from point A to point B is considered to be the same thing as a line from point B to point A. In a digraph, short for directed graph, the two directions are counted as being distinct arcs or directed edges. Typically, a graph is depicted in diagrammatic form as a set of dots (for the points, vertices, or nodes), joined by curves (for the lines or edges).

Path: A path through a graph is any sequence of connected edges.

Directed Acyclic Graph: A directed acyclic graph, also called a dag or DAG, is a directed graph with no directed cycles. An edge e=(x, y) is considered to be directed from node x to node y; y is called the head and x is called the tail of the edge; y is said to be a direct successor of x, and x is said to be a direct predecessor of y. More generally, if any path leads from x to y, then y is said to be a successor of x, and x is said to be a predecessor of y.

Feature Tree: A feature tree is a directed acyclic graph in which the non-leaf nodes are associated with primitives and any node can be associated with a, possibly empty, set of logical expressions. That set of logical expressions sometimes being refereed to as the set or list of AUTs. Technically speaking, a tree is a special case of a directed acyclic graph in which no node can share a common tail (although many edges obviously share a common head). But the inventors sometimes use the term "tree" instead of DAG as it is sometimes more intuitive. The fact that the feature tree is more generally a DAG is more of an implementation detail that the inventors use to reduce the amount of memory and offline storage required to store a feature tree.

Forest: A forest of feature trees is simply a set of feature trees. The inventors have found that it is sometimes easier or more convenient to represent a set of logical expressions as a forest of trees. Technically speaking, a forest of trees is actually a forest of directed-acyclic graphs, but the inventors are unaware of a term for a collection of DAGs that is as intuitive sounding as the word "forest".

Walking a tree: Evaluating a tree is sometimes called walking a tree and it involves starting at the root node and following a path down the tree according to the value of each of the primitives associated with each of the nodes. The set of nodes visited as the tree is walked define a path through the tree. At each node on the path down the tree any logical expressions (or AUTs in one preferred embodiment) associated with a visited node are added to a list of collated logical expressions. Walking a tree typically terminates upon reaching a leaf node. Sometimes an empty leaf node is not explicitly represented in which case walking a tree can terminate just before the non-represented node would have been visited. Sometimes, walking a tree can be terminated early, before reaching a leaf node, if all the information required has been gathered. For example, if we only wish to know if some particular logical expression is true, we can terminate once its status has been resolved.

Walking a forest: Walking a forest of trees simply entails walking each tree in the forest in turn. At the start of the procedure the list of collated logical expressions is typically empty. The list of collated logical expressions is added to as each tree is walked in turn. After the last tree has been walked, the final collated list of logical expressions represents the list of true logical expressions. Equivalently, the final collated list can be created as the union of all the individual collated logical expressions from walking each tree. Any logical expression not in the final collated list is false. In one preferred embodiment, the collated list of logical expressions is sometimes referred to as the collated list of AUTs.

Non-player character (NPC): An NPC is a computer-controlled character in a video game, sometimes also referred to as an AI character.

The scope and spirit of the invention is not limited to any of these definitions, or to specific examples mentioned therein, but is intended to include the most general concepts embodied by these and other terms.

FIG. 1 shows a very generic view 100 of machine learning. In particular, there is a machine learning component 101 that learns an association between inputs and outputs. The invention is also potentially applicable to non-machine learning applications, in which case the machine learning component 101 could be an algorithm that requires logical expressions to be evaluated as part of its input(s). Whatever its nature may be, the machine learning component 101 runs on a computing device 105.

In one preferred embodiment the output 102 of the learning is a prediction about how a game character would behave if a human trainer controls it. But in general, the output 102 depends on an application and could be anything related to the application. For example, in a medical application, the output might be a diagnosis of whether a patient has a disease, or a probability as to whether he/she has a disease. In a business application, the output might be whether a customer is likely to be interested in a book in an online store. Or it might be a prediction of a yearly income of a customer. Internal to the learning component there might be other outputs that change the internal state of the component to reflect what has been learned. For example, in one preferred embodiment, internal weights are updated in response to inputs. The inputs to the learning include a set of input features (104). The invention is potentially applicable whenever obtaining the value of one or more of those inputs requires the evaluation of a set of logical expressions. In one preferred embodiment, the inputs typically convey information about the state of the game world. But in general, the inputs depend on the application and could be anything. For example, in a medical application inputs could include the results of various medical tests, information about medical histories, etc. In a business application, inputs could be information about past purchases, information about past purchases by similar people, and etc. One important input, that may or may not be represented as a feature, is some training signal. In one preferred embodiment, the training signal is information about how a human player behaves in similar game situations. In a medical application, the training signal could be the correct diagnosis for exemplary cases. In a business application, the training signal could be the actual incomes for some exemplary customers. Sometimes, there is a separate learning phase in which input features are supplied along with a training signal and the learning component attempts to adapt itself to learn a correspondence between input features and the training signal. That is, it tries to match a desired training signal. In a separate prediction phase, the training signal is absent and the learning component just uses what it has already learned to make predictions. In one preferred embodiment, the learning and prediction phase can happen simultaneously and learning occurs within seconds to match changes in the training signal. Other forms of training signal include rewards and punishments from the environment from which good predictions must be inferred indirectly.

The invention is relevant to the rapid evaluation of logical expressions in a wide class of applications and algorithms. The material about computing input features for machine learning, presented in the context of one preferred embodiment, is supplied to provide a helpful background to understand one possible specific use of the invention and is not intended to be limiting in any way.

Input features are only one subset of all the features (103). The other features are those upon which the input features depend. For example, if an input feature is "A && B" then the values of both conjuncts, A and B, need to be calculated in order to determine the value of the entire conjunct.

Some of those other features will not depend on any other features. These are called raw features. In one preferred embodiment, raw features are computed using function calls within, or by accessing information from data-structures within, other software components that comprise the game. In general, the raw features may be associated with sensors like thermometers, radar, sonar, etc. Or raw feature values could come from information entered by humans, or automatically transmitted over the Internet, or all manner of conceivable sources. In a virtual world, sensors could include any simulated real-world sensor, or made-up sensors, or simple communication between software components. The information from raw features can either be pushed in from the environment when available or pulled in when needed. Portions of the raw feature information might first be filtered, altered or discarded by other systems that make up the application.

In one preferred embodiment, learning components are arranged in hierarchies so that some features are themselves teaming components that have their own associated features.

In one preferred embodiment, some portions of the features 103 are represented as a set of feature trees.

In one preferred embodiment, some portion of 101 and the features 103 can be represented as data that can be stored on some physical medium 106. In which case, before it can be used, the stored data must first be loaded or unserialized 108 to create a copy of the stored data in the working memory of the computing device 105. After some learning has taken place, the results of that learning will be represented in some portion of any of the changed state of 101 and 103. The results of the learning can then typically be stored or serialized on the physical medium 106 so that it can be retained after the computing device is turned off. When the computing device is turned back on, what has been previously learned can be reloaded. Of course, the physical medium needs not be directly attached to the computing device, but could instead be reachable over some network. The stored data might also be made accessible to other computing devices over some network.

Figure 2:
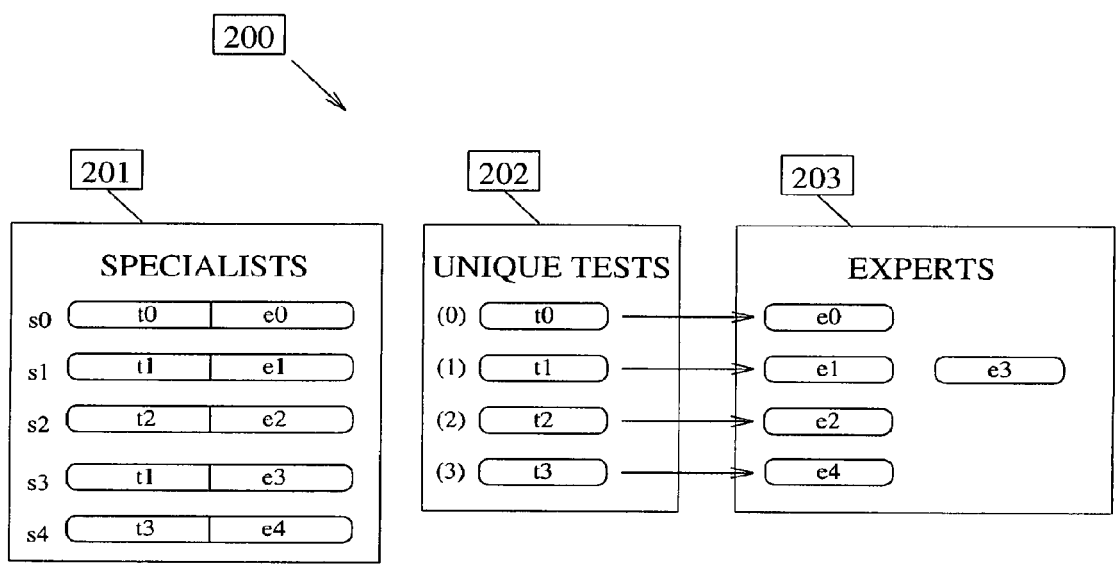
FIG. 2 shows how sets of logical expressions arise in one preferred embodiment.

FIG. 2 shows a diagram 200 of how sets of logical expressions arise in one preferred embodiment. As shown in the figure, there are 5 specialists: s0, . . . , s4, but in realistic applications the inventors have employed thousands of specialists. Each specialist includes a test and an expert. A test or tests can be shared among specialists. For example, specialist s1 and s3 both share test t1. The set created from the union of all the specialist's tests is called the set of unique tests 202. Each unique test can be assigned a unique numerical identifier. For example, in the unique tests 202, the number in parentheses represents a unique identifier for each unique test. Each unique test is associated with a subset of the set of experts 203 mentioned in the specialists. The subset of experts associated with a test is just the list of experts from the specialists with that test. For example, test t1 is associated with the experts e1 and e3. The set of tests can then be evaluated to determine which ones are true. The experts associated with any active unique test (AUT) are then said to be active. As a convenient shorthand, the unique test being active is interchangeably used herein. The set of active experts is used as the input to a variety of online learning algorithms.

Accordingly, any set of tests can easily be converted into a set of unique tests by simply discarding duplicates, the invention therefore applies to any set of provided tests that contains duplicates.

Figure 3:
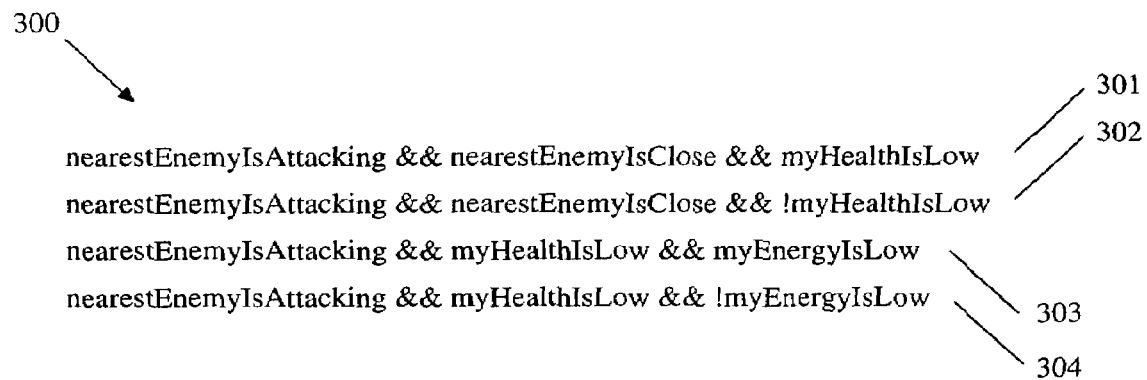
FIG. 3 shows an example set of logical expressions of the type that arise in one preferred embodiment.

FIG. 3 shows 4 possible exemplary logical expressions 300. For example, they could be the unique tests associated with specialists as in 202 from FIG. 2. But for the purposes of the invention it is not important where they come from. The invention allows to evaluate an equivalent set of feature trees to determine which subset of the logical expressions are currently true.

Each expression in FIG. 3 is a conjunction, but the invention also applies to provide logical expressions of any form. This is because any logical expression can be converted to some suitable normal form, such as disjunctive normal form (DNF). Once in DNF each clause will be in the form of a conjunction and each unique disjunct can be added as a unique logical expression. Therefore the collection of logical expressions can have the same form as in FIG. 3.

It may be noted that it is a simple matter to record that a logical expression was originally just one clause of some original larger logical expression in DNF. Since a disjunction is true if any of its disjuncts are true, whenever a logical expression that corresponds to one clause is determined to be true, the original logical expression can be marked as true. Once one disjunct has been determined to be true, there is obviously no need to further evaluate any feature trees whose sole purpose is to determine the truth of logical expressions that correspond to other disjuncts. Therefore, in the case that some unique logical expressions are derived from larger DNF logical expressions, it might not always be necessary to evaluate each feature tree in the forest of trees that represents the set of logical expressions.

In FIG. 3, the set of primitives is {nearestEnemyIsAttacking, nearestEnemyIsClose, myHealthisLow, myEnergyisLow}. These primitives are examples of features like those found in one preferred embodiment and their semantics could be something like:

nearestEnemyIsAttacking: Is a feature that is true if the nearest enemy to the NPC for which a prediction is currently being made is attacking the NPC, and false otherwise.

nearestEnemyIsClose: Is a feature that is true if the nearest enemy to the NPC for which a prediction is currently being made is within some specified distance, and false otherwise myHealthisLow: Is a feature that is true if the NPC for which a prediction is currently being made has low health. If could, in turn, be defined from other features as something like "myHealth<5". In which case, "myHealth" would be one of the primitives.

myEnergyisLow: Is a feature that is true if the NPC for which a prediction is currently being made has low energy.

Figure 4:
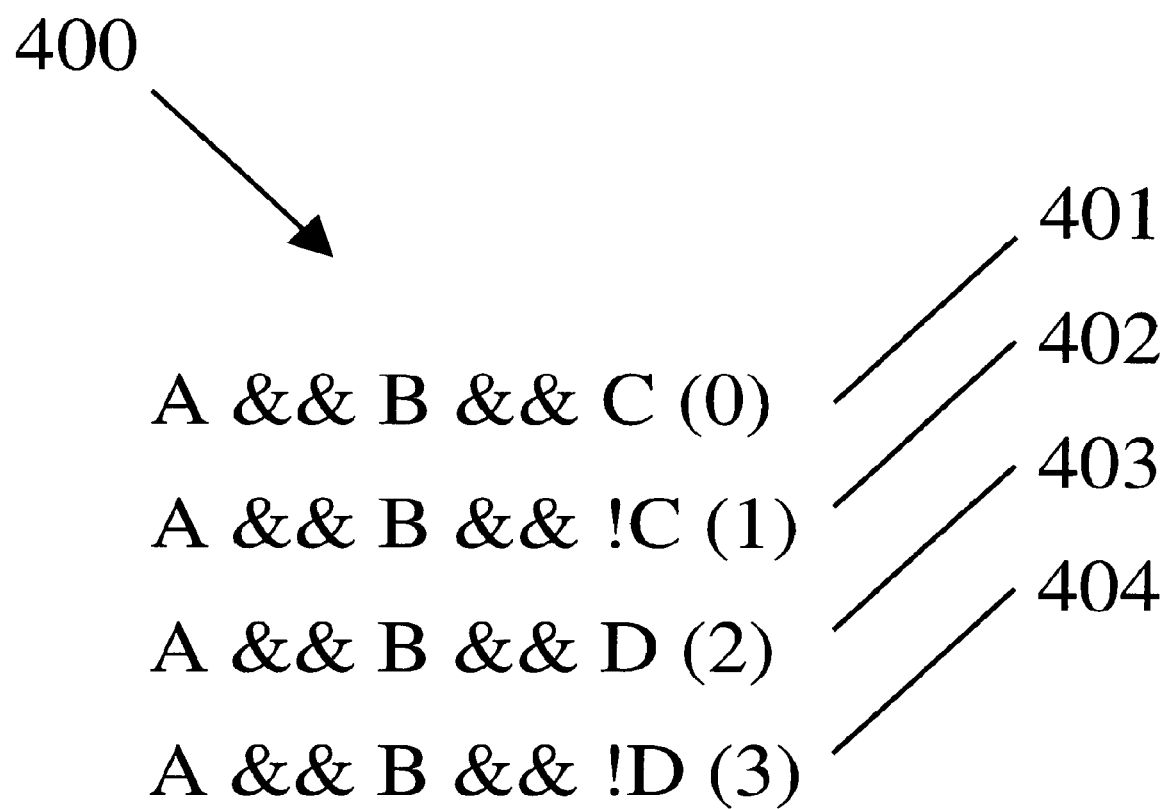
FIG. 4 shows an example of an abstract set of logical expressions.

FIG. 4 shows an abstract set of logical expressions where the set of primitives is {A, B, C, D}. As an abstract example, it is deliberately unspecified what the semantics of the primitives actually are, but they could correspond to any subroutine or program code. In particular they could correspond to game-dependent terms shown in FIG. 3, such as "myHealthIsLow", or "nearestEnemyIsAttacking". In other applications, they could correspond to terms such as "itIsRaining" that require determining some aspect of the real world. For the purposes of the invention, all that matters is that there is some way to determine, or look up, the last known, or recent, value of a primitive.

FIG. 3 shows that the same primitives appear repeatedly in each logical expression. These repeated occurrences of a small number of primitives that can be exploited to speedup the evaluation of the logical expressions by reducing the number of times they have to be evaluated.

In contrast, a naive approach to evaluating logical expressions of the form in FIG. 3 would be to simply consider each expression in turn and then within each expression to consider each conjunct in turn. If the all the conjuncts are true, then the logical expression itself is true and false otherwise. But evaluating each conjunct would require evaluating each primitive once for each conjunct in which it appeared. A simple speedup would be to terminate early if one of the conjuncts is false; as we immediately know a conjunction is false if any of the conjuncts is false. But this still doesn't help to significantly reduce the expected number of evaluations of the primitives.

The numbers in brackets label each logical expression. For example, logical expression 2 is "A && B && D" (403). In one preferred embodiment, these labels correspond to as the number of the unique test. So if the logical expression number 2 was true, the inventors would sometimes say the unique test 2 was active, or equivalently, the list of AUTs includes test number 2.

Figure 5:
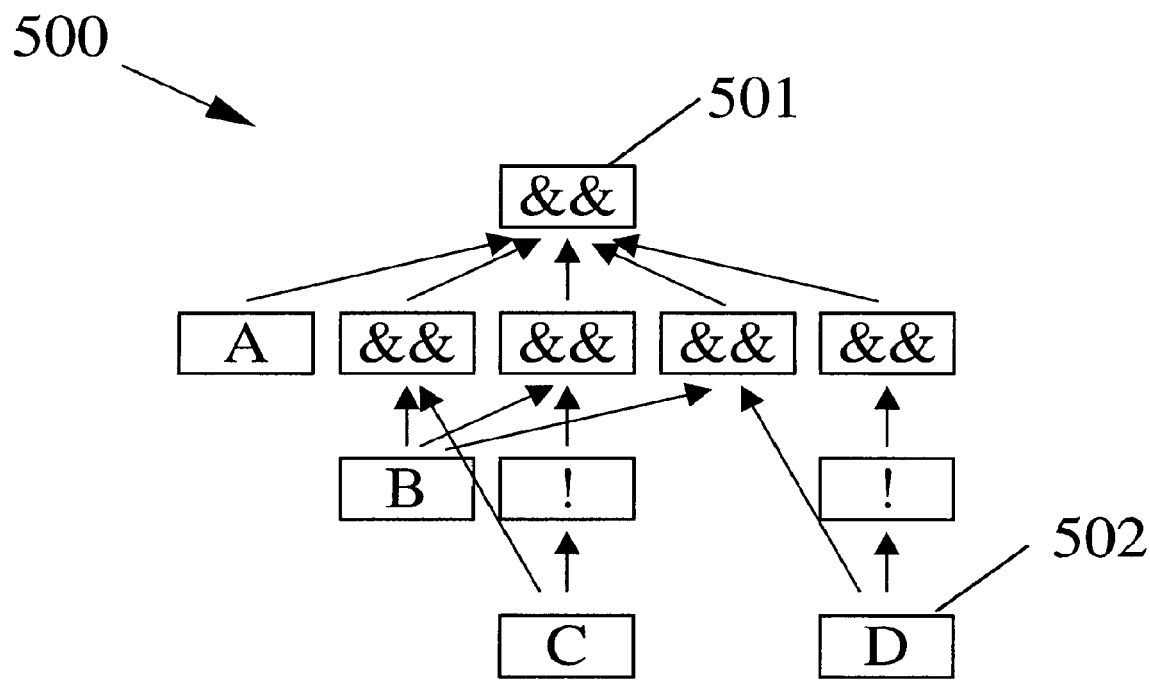
FIG. 5 shows prior art of the type of tree-like structure that might arise from parsing the expressions in FIG. 4.

FIG. 5 shows an exemplary expression tree 500 that corresponds to the logical expressions in FIG. 4 and is of the type often generated by program language compilers. It is principally designed to exploit common sub-expressions to speedup computation. Unfortunately, it does not typically help to significantly reduce the number of feature evaluations. In the example, each node represents a feature. The features at the leaves correspond to primitives whose semantics are determined by the particular application. For example, node 502 corresponds to the feature D. The value of feature D is propagated bottom up and is combined at the node above with other feature values from below. The features at non-leaf nodes have their semantics fixed by the normal rules of mathematical logic. For example, the node 501 corresponds to an "and" (&&) feature that is true if both its conjuncts are true. Eventually the value computed at the top of the tree is the value of the expression. In the figure, it takes at least 21 evaluations to determine the subset of true logical expressions. There is not one single expression tree that could be created from the logical expressions in FIG. 4. FIG. 5 is just one possible expression tree. Other expression trees could have better computational properties, but since they are not designed to reduce primitive evaluations, they typically do not compare to feature trees in terms of reducing the number of evaluations.

Figure 6:
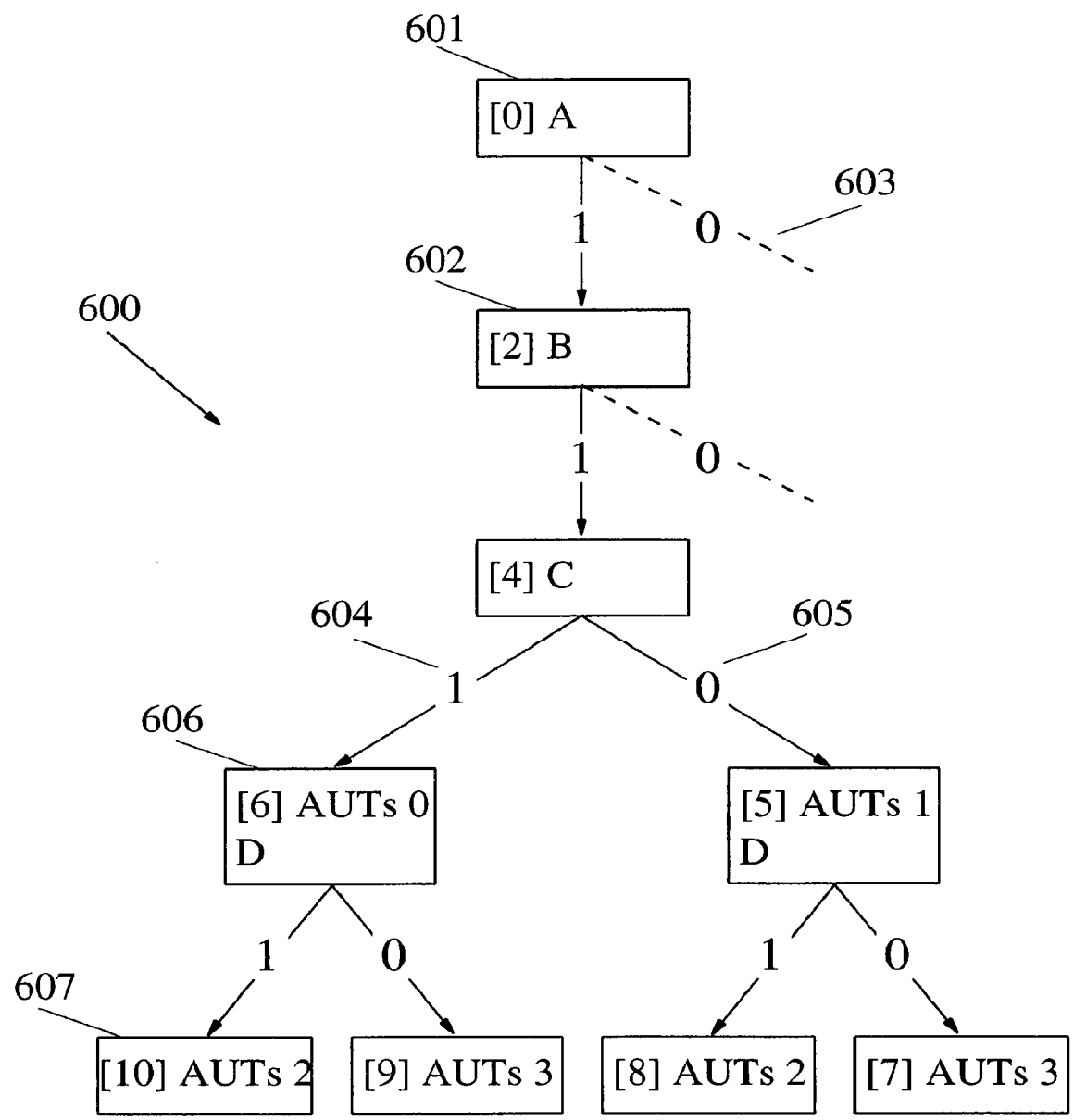
FIG. 6 shows an example of a feature tree that could be used to represent the expressions in FIG. 4.

FIG. 6 shows an exemplary feature tree 600 that corresponds to the logical expressions in FIG. 4. Each non-leaf node corresponds to one of the primitives. The tree is evaluated top-down by starting at the root node 0 601 and walking the tree according to the values of the primitives. That is, at each non-leaf node the corresponding primitive is evaluated on the path taken down the tree along the edge that corresponds to the current value. For example, if the primitive A is true (i.e. 1), then the edge to node 2 602 is taken.

If A was false (i.e., 0), then path 603 is taken. But because all the logical expressions in FIG. 4 are necessarily false if A is false, the path along 603 leads to the leaf node 1. Node 1 is not shown because there is no need to explicitly represent empty leaf nodes. Non-represented leaf nodes can always be inferred from the numbering of the nodes. For example, node 1 can be inferred from the jump from node 0 to node 2. Upon taking the path along 603, execution terminates and the feature tree-walking algorithm returns an empty list of true logical expressions. That is all the logical expressions are false.

It is assumed that A is true, then the feature tree walking algorithm proceeds to node 2 and primitive B is evaluated. Evaluation of the feature tree continues in this manner until a leaf node (possibly an empty one) is reached.

Eventually, a node like node 6 is reached 606 which, as well as an associated primitive, also has an associated list of AUTs. In the case or node 6, the list of AUTs includes a list of one item containing the number 1. What this means is that if the evaluation path passes through node 6, then AUT 1 is added to the list of true logical expressions. This means that given the point we have reached in the tree, the logical expression number 1 can now be assumed to be true. The term AUT comes from one preferred embodiment where it stands for "active unique test".

When a leaf node, like node 10 607 is reached the algorithm terminates. In the case that it reached node 10, the list of accumulated AUTs will be {0, 2}. That is, logical expressions number 0 and number 2 are true, and (inferable from their non-appearance in the list) number 1 and number 3 are false. Moreover, the only way to reach node 10 is if the primitives A, B, C and D are all true. Each of which only had to be evaluated once to determine the complete subset of true logical expressions.

Note that, as defined, the feature tree that corresponds to a set of logical expressions is not uniquely determined. That is, there are multiple possible feature trees that can represent the same set of logical expressions. For example, in FIG. 6, nodes 0 601 and 2 602 could be swapped without disrupting the structure of the rest of the feature tree. Different feature trees can have different computational properties. In one preferred embodiment, a set of feature trees (i.e., a forest) is typically used to represent one large set of logical expressions. Wherein there are many possible different sets of trees that can represent one set of expressions. Even the number of trees in the set is not uniquely determined.

FIGS. 7 through 24 depict various real-world examples of the invention that were actually generated using computer code from one or more preferred embodiments. They are feature trees used to determine the context for learning in an extremely simple video game as a test bed and example by the inventors. Feature trees for more realistic video games are typically much more numerous and much larger. The feature trees figures are therefore included for pedagogical purposes to educate the reader on the current invention.

Figure 16:
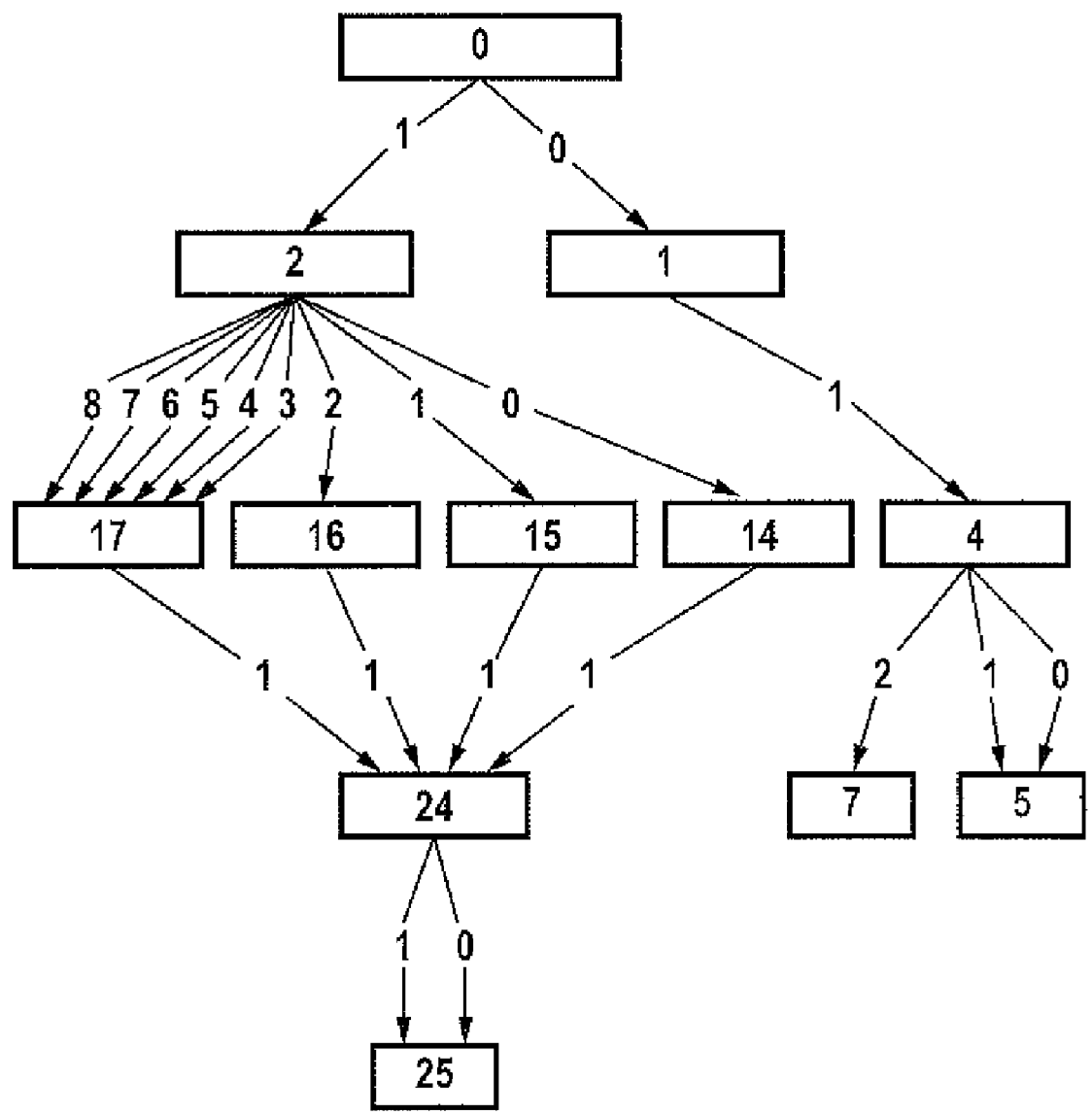
Figure 17:
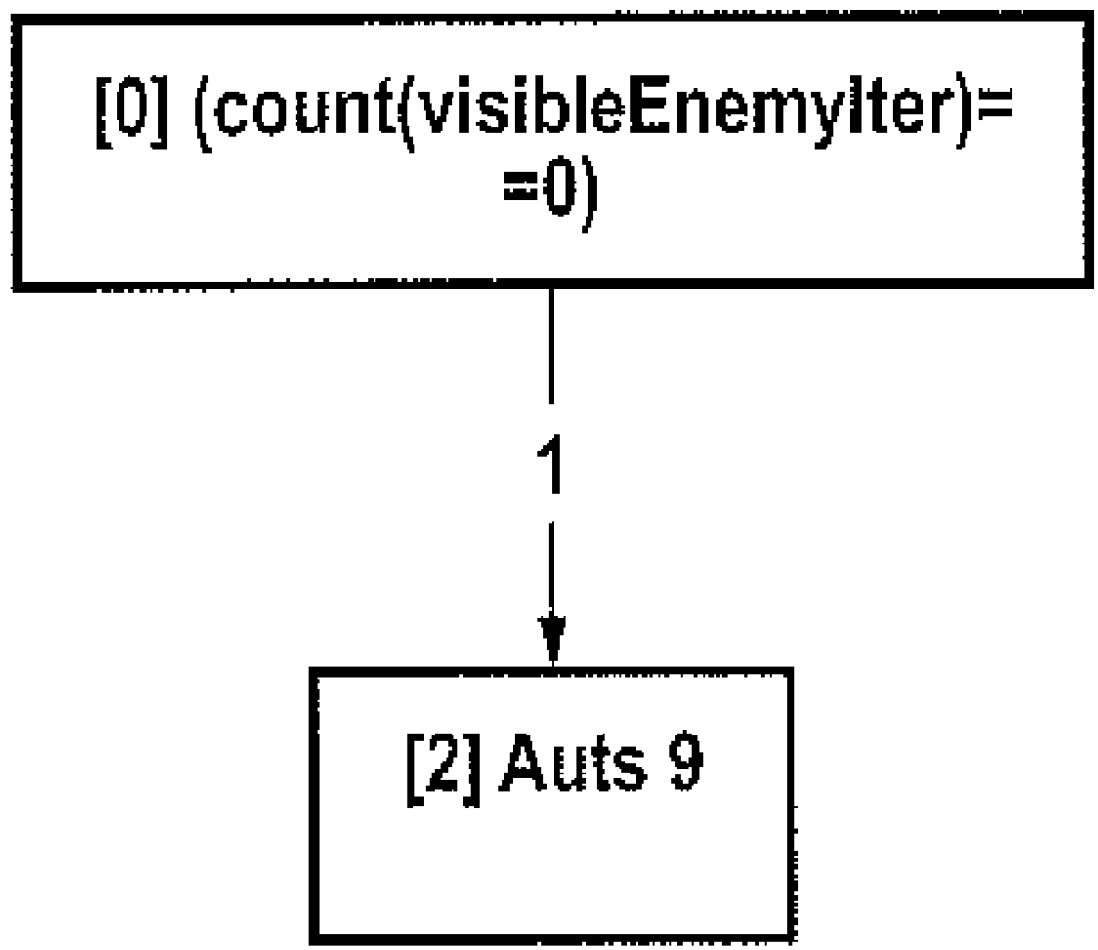
Figure 18:
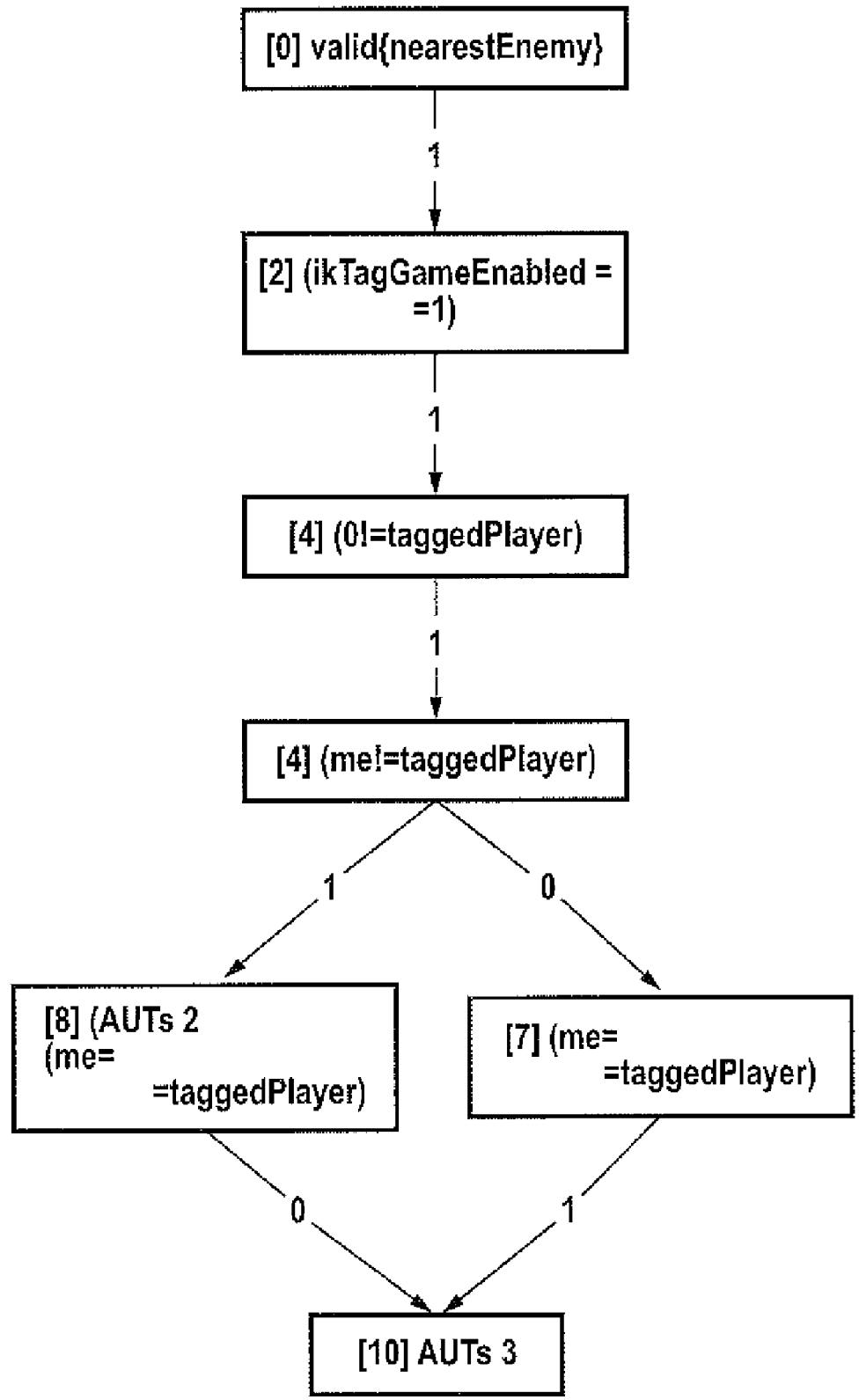
Figure 19:
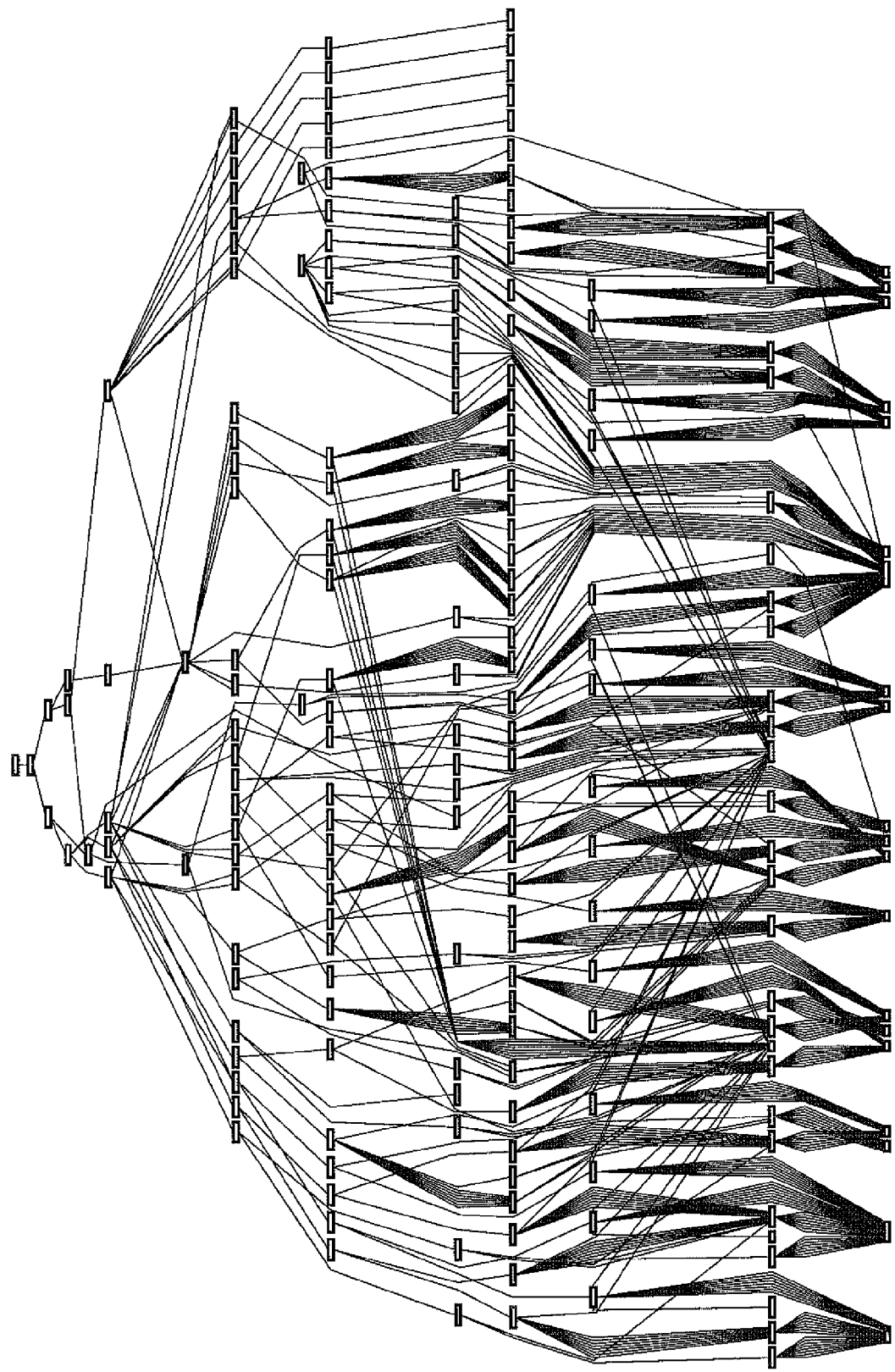
Figure 20:
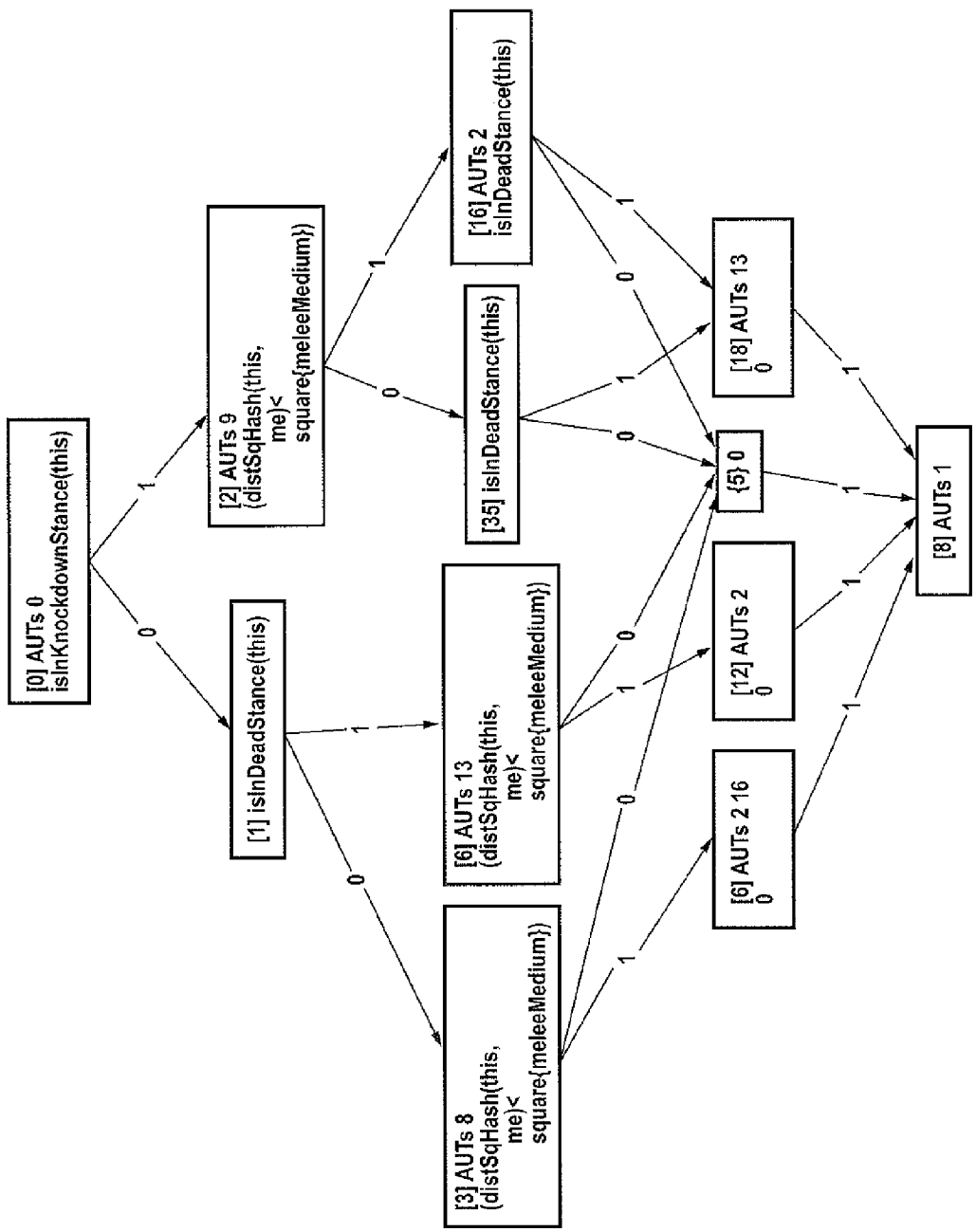
Figure 21:
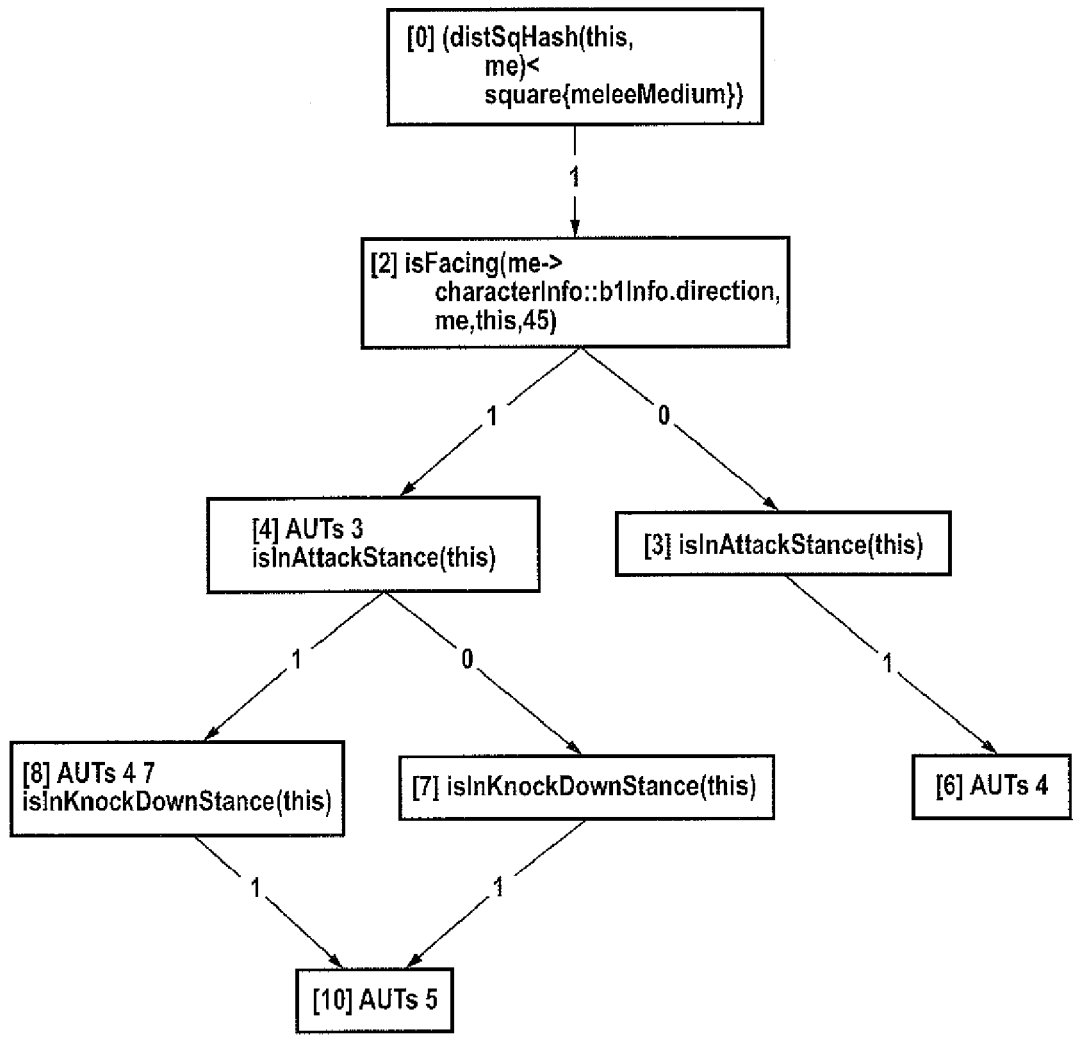
Figure 22:
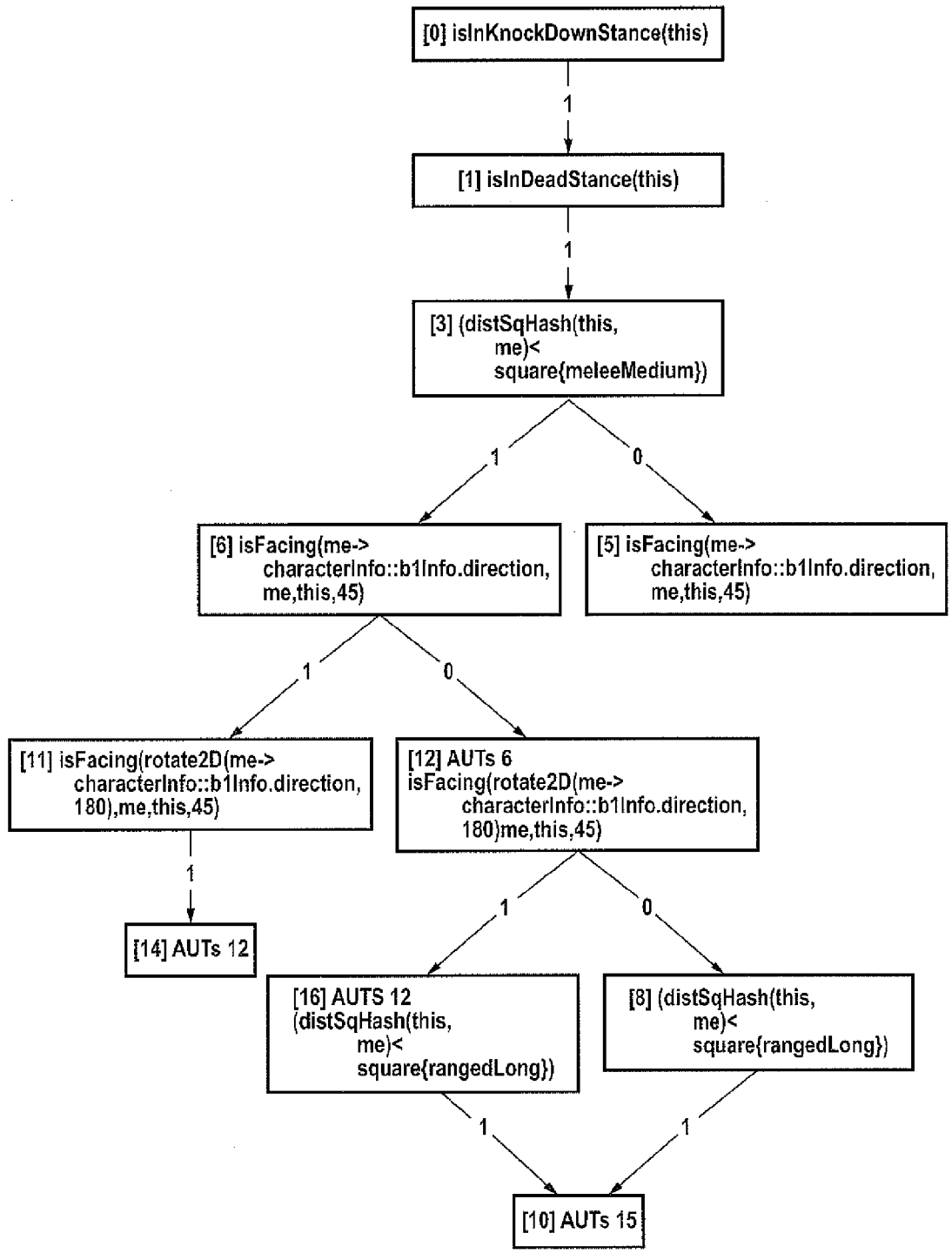
Figure 23:
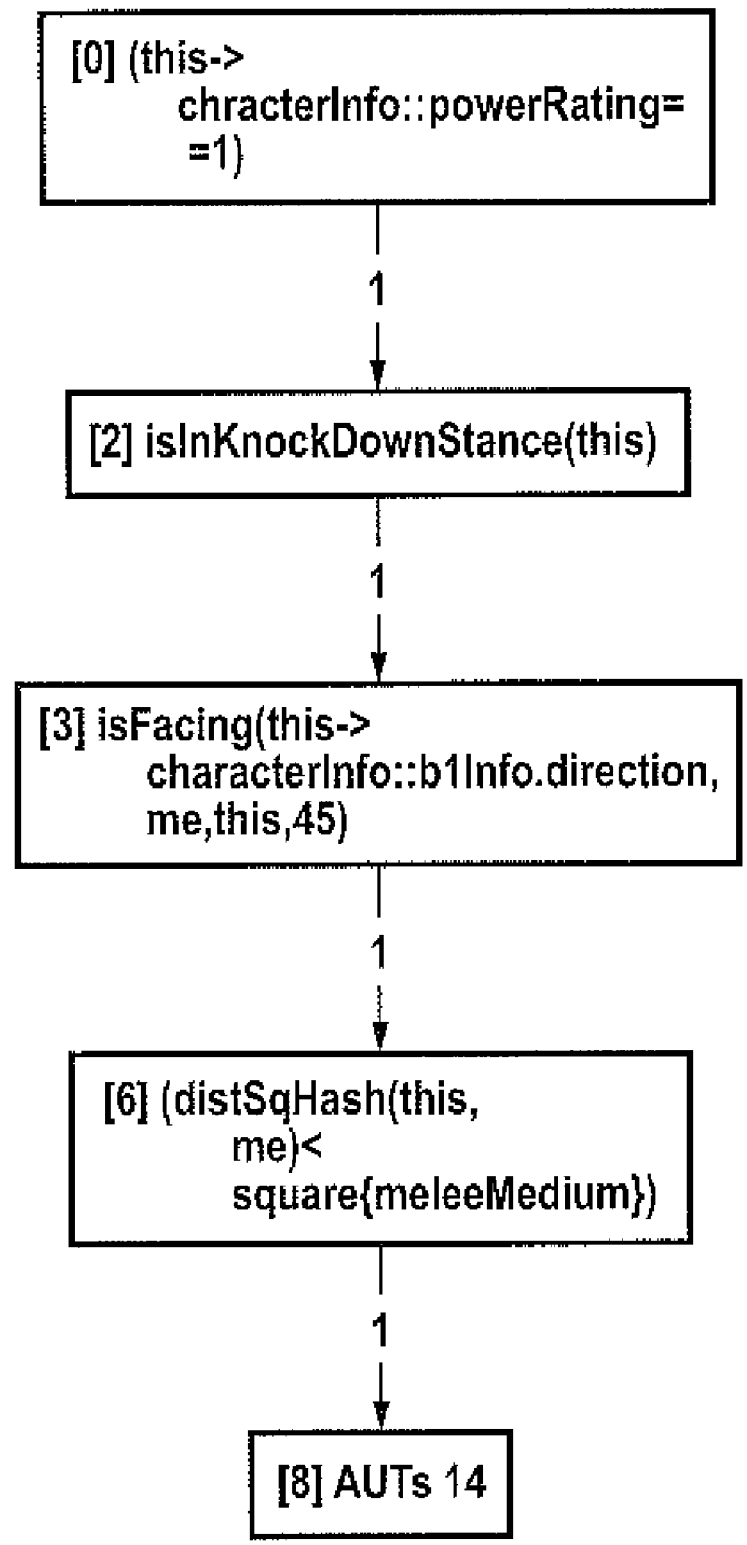
Figure 24:
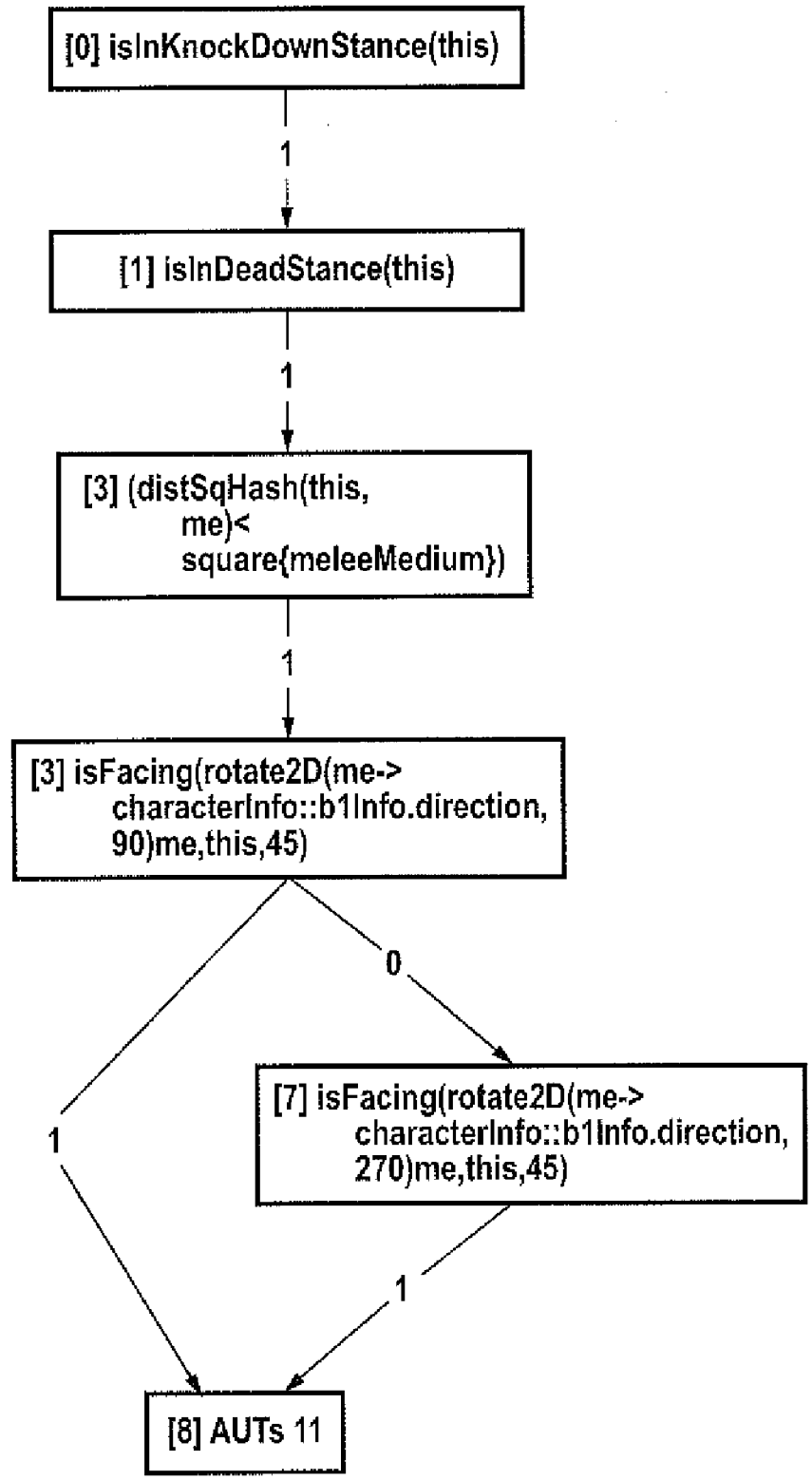

FIGS. 16, 17 and 18 are the feature trees used to determine the context for learning to imitate the player's choice of speed.

The root node simply checks the value of a primitive to see whether the character for which the context is being determined can see any enemy characters. That is, if the count of the number of items in the iterator over the visible enemy characters is zero, then there are no visible enemies.

In FIG. 16, if the result of the root node primitive evaluation is true, that is equals 1, then the edge labeled "1" is taken. This leads to a leaf node that mentions AUT number 9. Upon reaching this node, we can infer that the test that corresponds to label 9 is true. AUT 9 will then be added to the list of true tests. After the feature tree in FIG. 18 has also been evaluated, this list of true tests is the complete list of true tests that determine the context for learning speed. That is the list is the complete list of active unique tests for that context. Any test whose identifier does not appear in that list, must be false.

Of course, the evaluation of the primitive at the root of the graph in figure might be false, that is equals 0, in which case AUT 9 will NOT be added to the list of true tests. Since nothing has to be done in this case when the node evaluation is 0, nothing is shown on the graph. This is true for the other graphs too. That is, when the value of a primitive at a node means no tests need to be added to the list of active tests, the corresponding edge is simply not drawn. An equivalent way of stating this is that if the evaluation leads to an edge with no tail, the edge is simply not drawn. But the existence of such an edge can be inferred from the number of the node. That is, the number of the node is the number that appears in square brackets. So in FIG. 17, there are two nodes shown, number [0] and number [2]. Node number [1] corresponds to the empty node that is the tail of the edge corresponding to the value "0" that is not shown.

The second and final feature tree in the speed forest is shown in FIG. 18. It is slightly more complicated that FIG. 17, but has many of the same properties. In particular, the leaf nodes with an empty set of active unique tests are not shown. Node [8] is interesting because it is includes a non-empty set of active unique tests at a non-leaf node. That is, it is NOT the case that a non-empty list of active unique tests occurs only at leaf nodes. Node [6] is also interesting because edges that correspond to each possible value of the primitive at the node are shown. This is because, in this case, each edge leads to a non-empty node.

Node [10] is also interesting in that it has two different head nodes. That is, it breaks the tree structure and makes the tree, technically speaking, into a directed graph. If node [10] was duplicated to make the feature tree into a tree, in the graph-theoretic sense, the functionality is unaffected. The only difference is that merging the identical ancestor nodes of [8] and [7] into a single node saves some memory.

Figure 7:
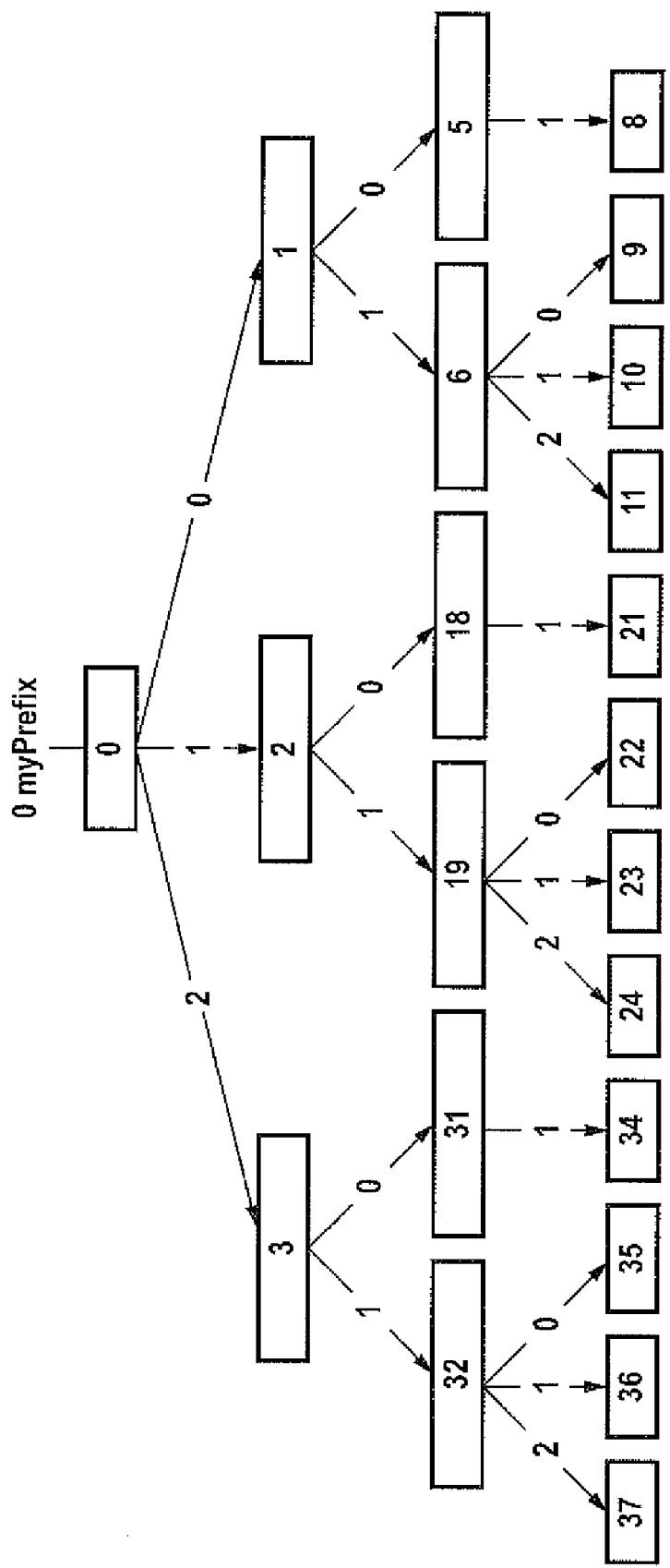

FIG. 7 is the feature tree used to determine the context for learning actions. Node [0] is interesting because the associated primitive is not Boolean valued. In particular, myPrefix refers to an aspect of the state of the character for which the context is being determined that relates to its progress through a "combo" move. For example, in a video game combination, or "combo", button presses AAB and ABB might result in two different moves. myPrefix records the current position in some "combo" and in the case it question can have three possible values.

The primitive at node [37] is also not Boolean valued and is interesting because it involves discretizing a real-valued output. In particular, the primitive measures the distance between the character for which the context is being determined and buckets the result into one of three possible ranges, or distance rings. Thus real-valued features, which potentially have too many values to represent in a feature tree, can easily be incorporated as discrete primitives.

Figure 8:
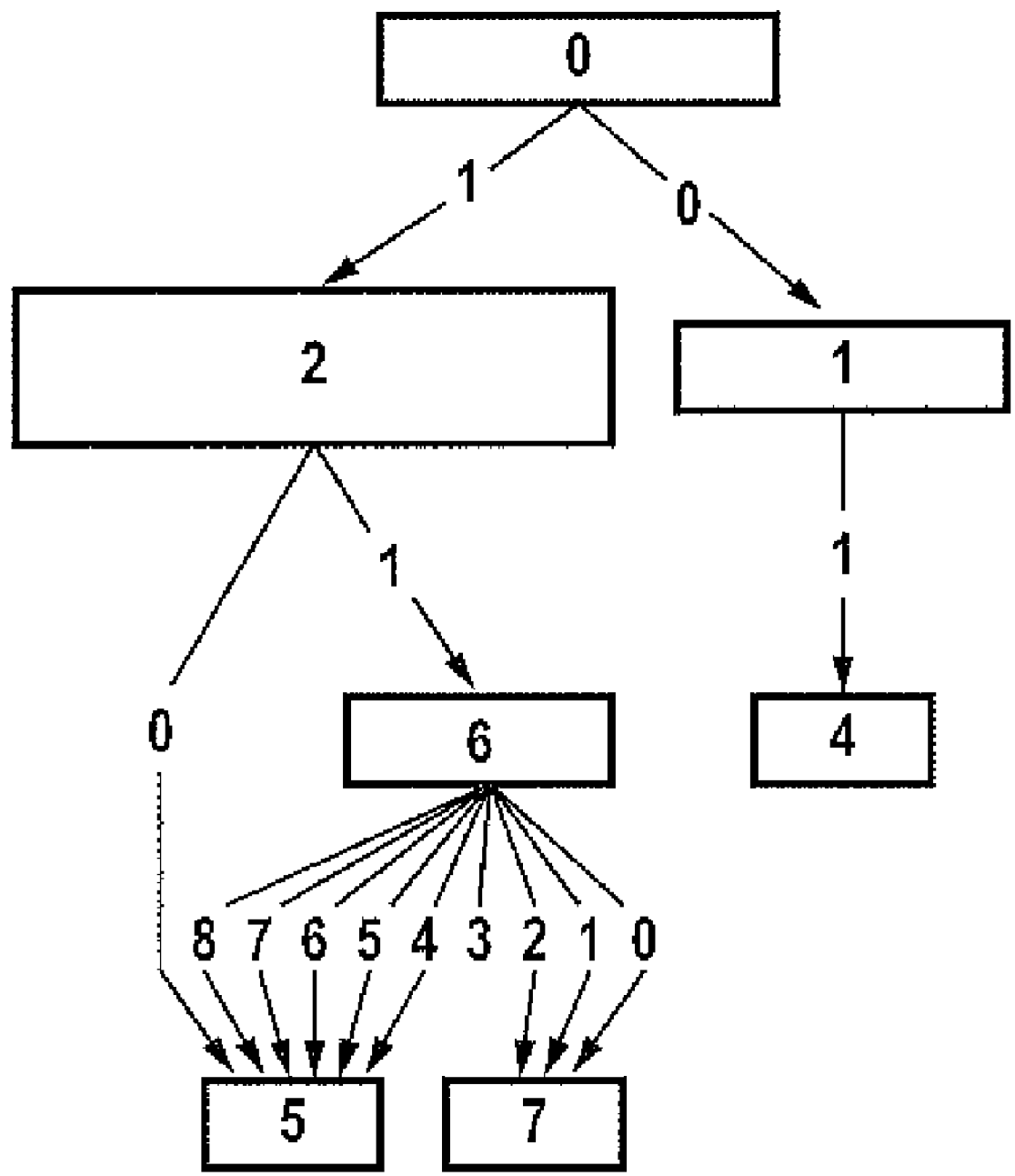
Figure 9:
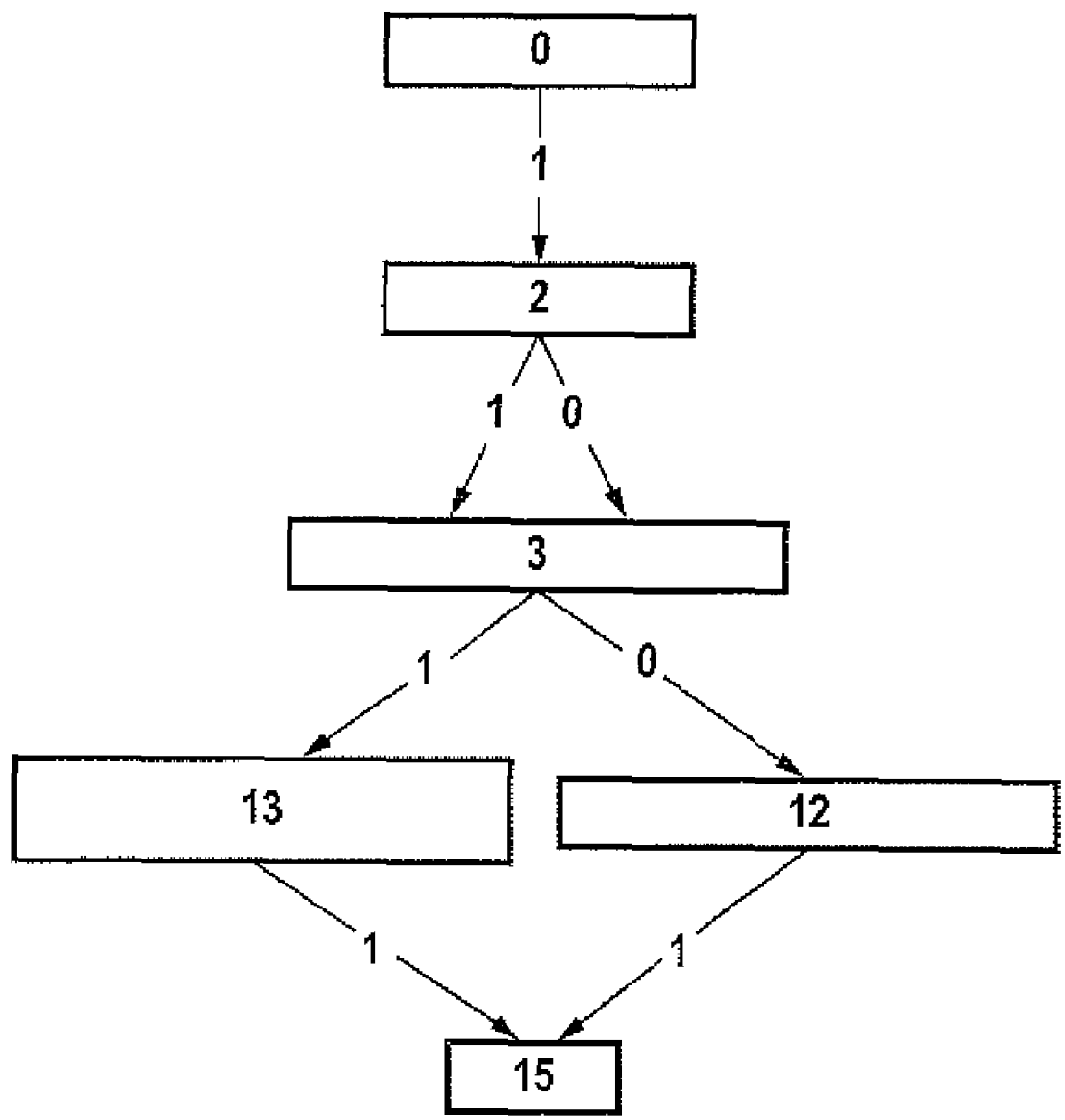
Figure 10:
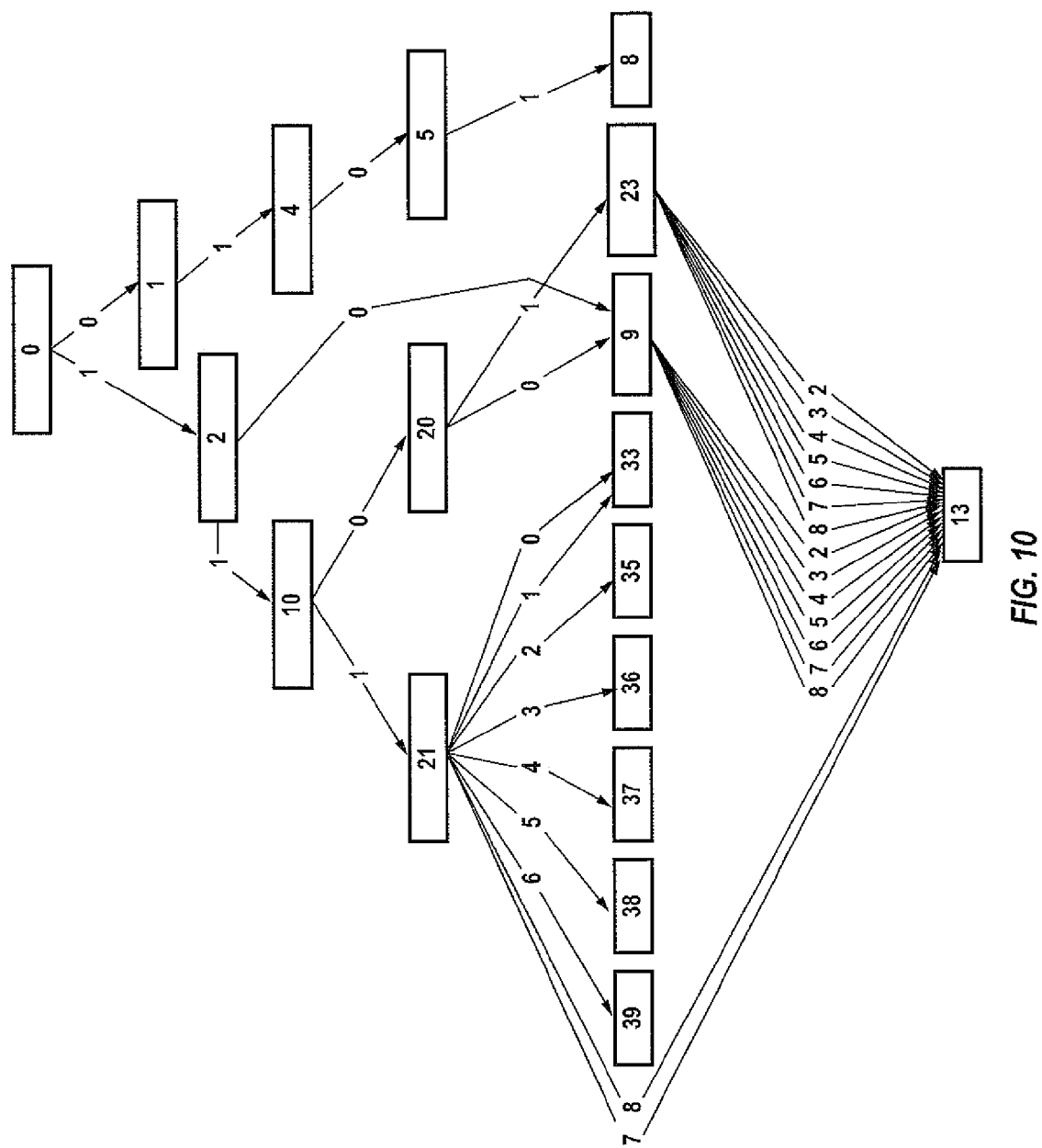
Figure 11:
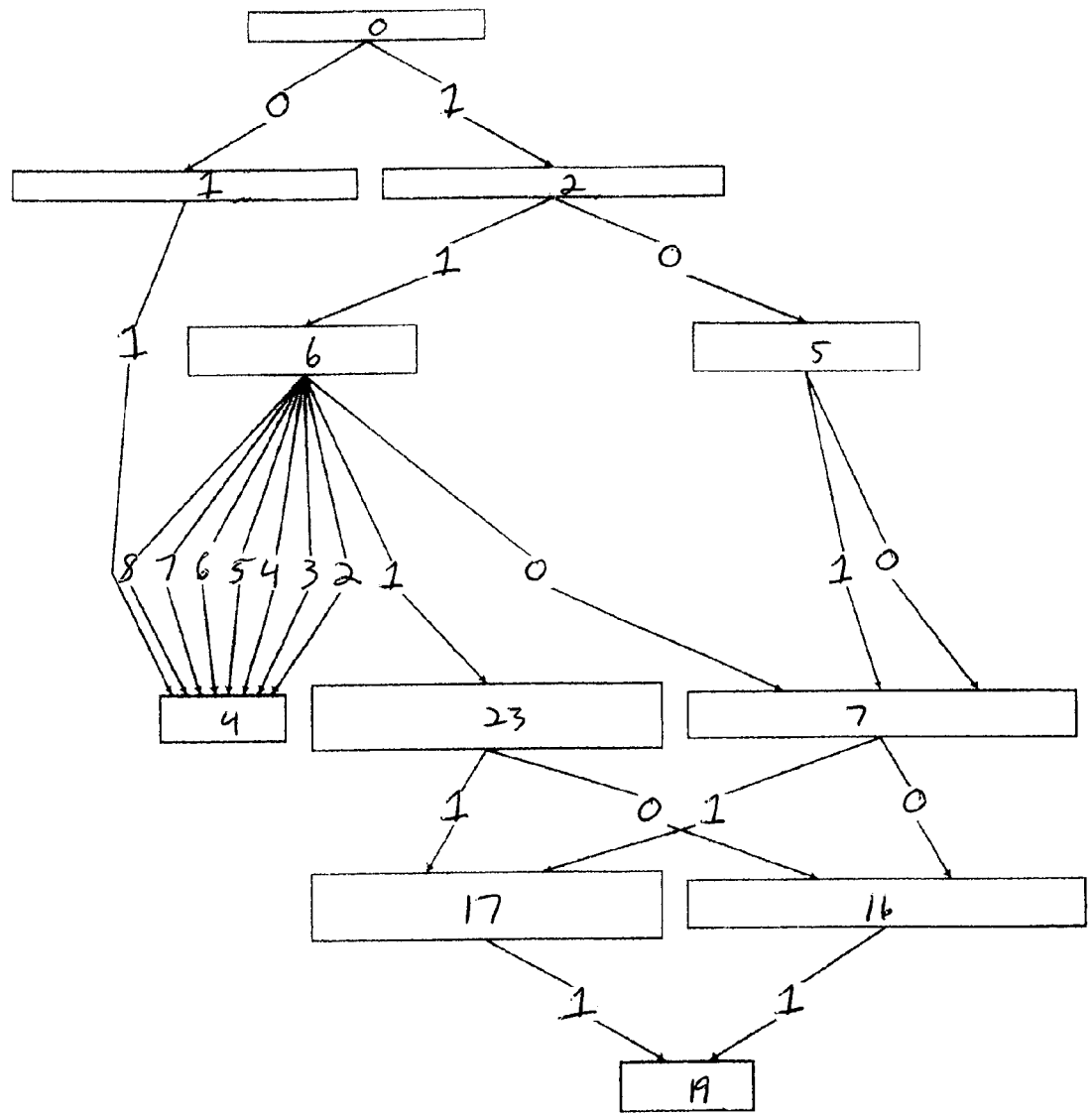
Figure 12:
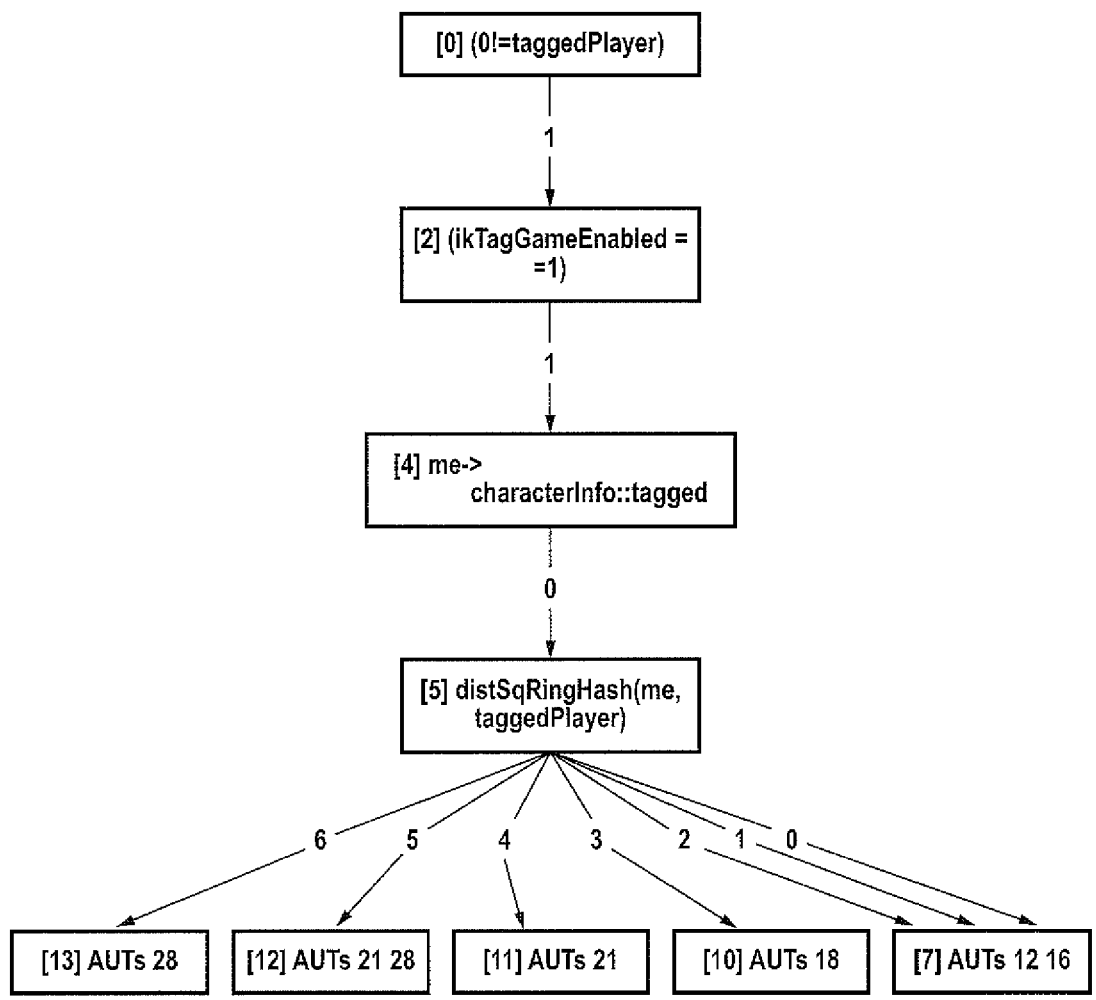
Figure 13:
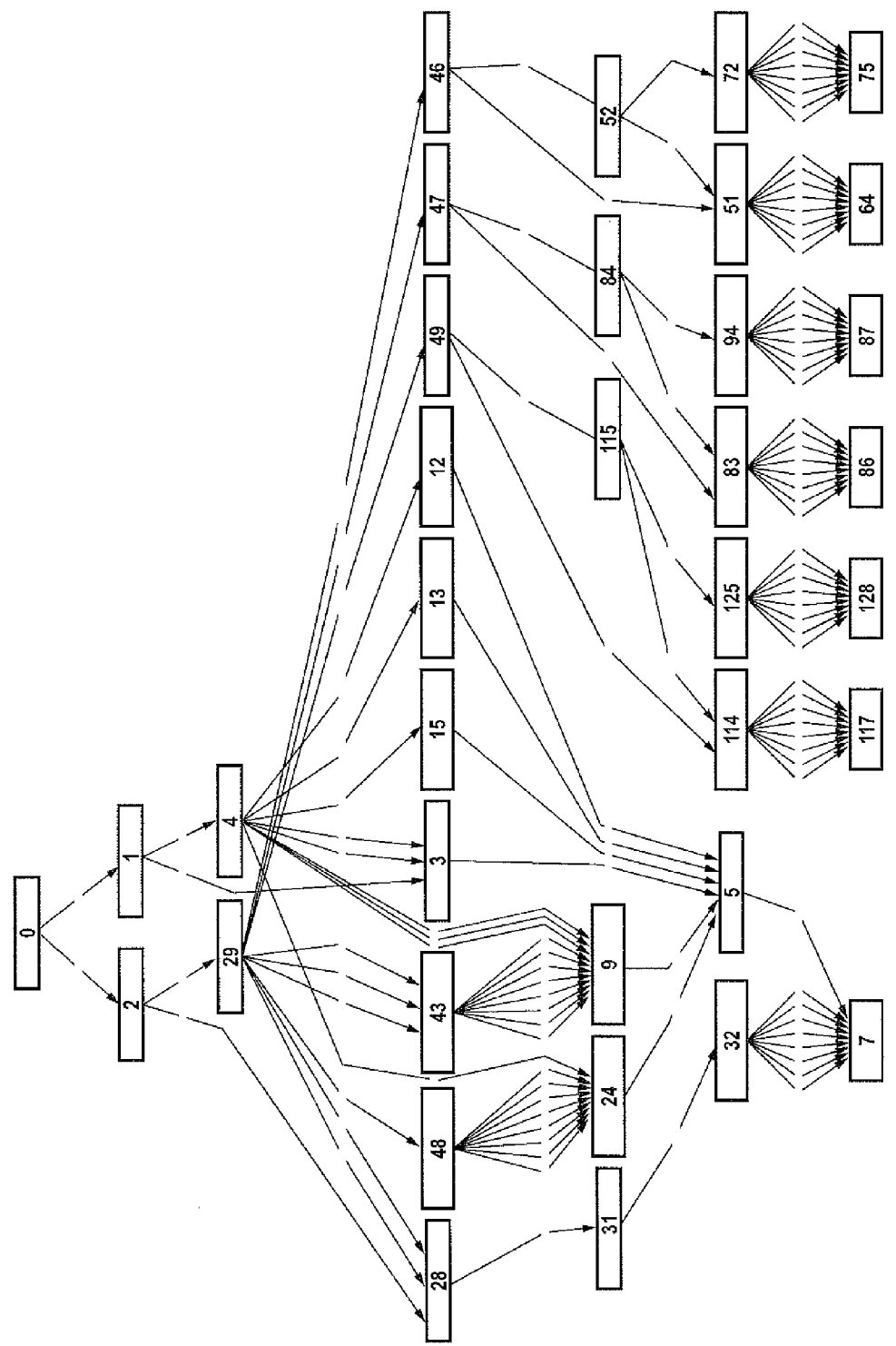
Figure 14:
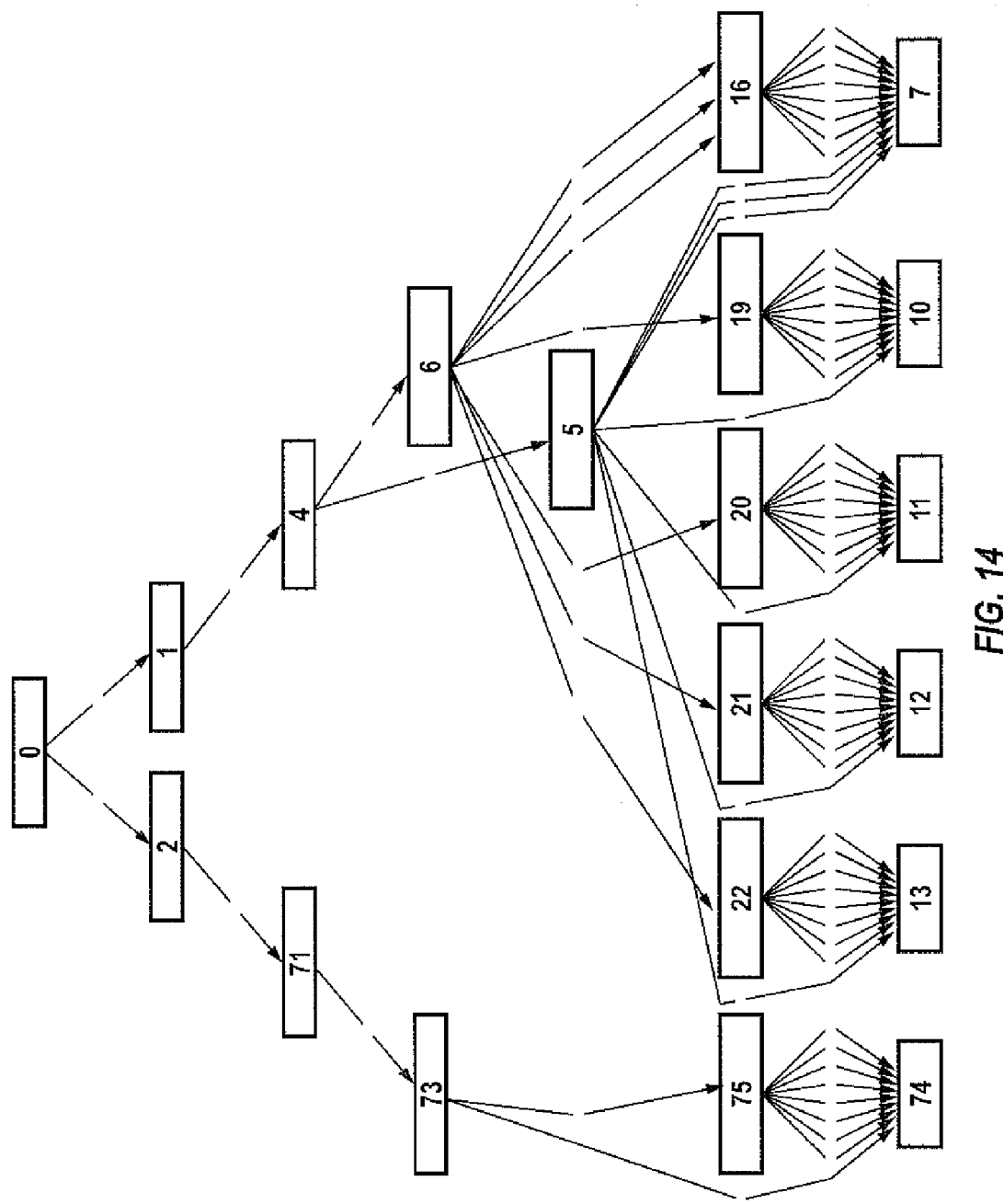
Figure 15:
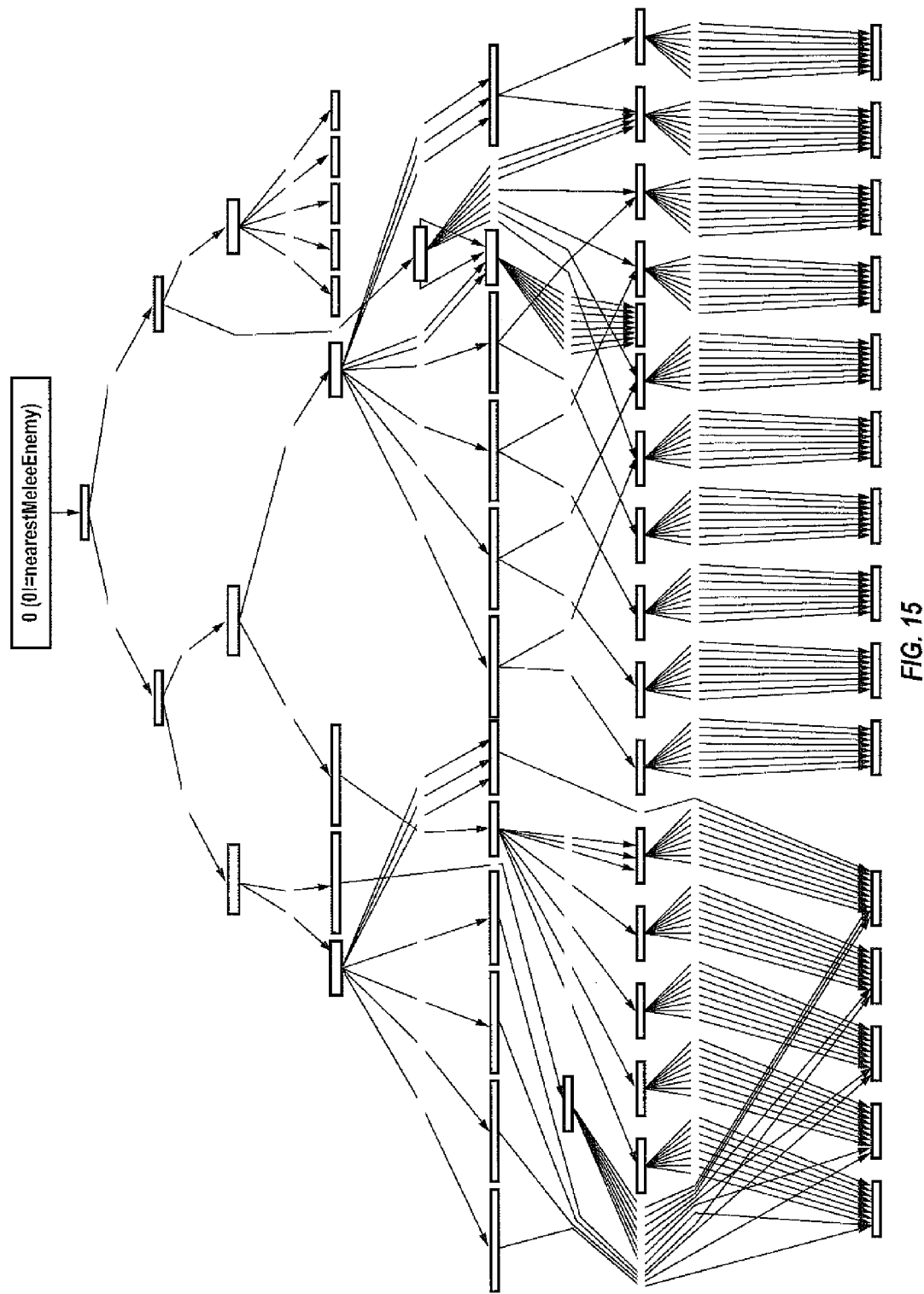

FIGS. 8 through 15 show feature trees used to determine the context for direction learning. FIG. 8 shows a tree used to determine a top-level context based on whether or not an enemy is present. FIG. 9 is used to determine the sub-context in the event that no enemy is present. FIGS. 10 through 15 are used to determine the sub-context in the event that an enemy is present. It is difficult to read any of the text on FIGS. 10 through 15 and there inclusion is primarily intended to hint at the fact that the structure of the feature trees can get quiet complex. But remember all these trees are for a very simple game, so for a real game the trees complexity can be stunning (see FIG. 19).

Rapid Determining

The number of primitive evaluations time it takes to evaluate one feature tree is proportional to the depth of the tree. That is because evaluating a tree corresponds to walking a single path in the tree as determined by the value of the primitives at each node and collecting up all the logical expressions associated with that path. Since the depth of a tree is typically logarithmic in the number of nodes, each tree can be evaluated rapidly. There are also typically only a relatively small number of trees in the forest of trees that represent the relevant logical expressions, so the complete set of true logical expressions can usually be evaluated rapidly.

Typically, each logical expression is only associated with nodes in one tree in a forest. The inventors sometimes refer to the set of logical expressions associated with a tree as that set of logical expressions associated with any node in a given tree. Therefore, after walking a tree any logical expression associated with that tree that is not in the list of collated logical expressions that are presumed true, can immediately be assumed to be false without having to wait until all the trees in the forest have been walked. Furthermore, the inventors sometimes refer to the set of logical expressions associated with a given depth as that set of logical expressions associated with any node in the given tree that appears at or above the said depth. Sometimes, a given logical expression that is associated with some tree is not associated with any node below some given depth. Therefore, when walking a tree, any logical expression associated with the current depth that does not appear in the collated list of presumed to be true expressions, can immediately be assumed to be false without walking the rest of the tree.

Handling Objects

The invention is also useful for determining the identity of objects represented by logical expressions involving their properties. For example, a virtual world used for a computer game might contain objects like virtual trees, other characters, weapons, cars, planes, etc. It is sometimes useful for logical expressions to implicitly refer to one or more of these objects by some property they might possess. For example, an expression might refer to, "the nearest enemy that is blue". Here the expression is referring to the object in question by the property that it is the enemy character that is the closest to the character from whose point of view the logical expressions are currently being evaluated.

It shall be noted that this implicit reference is in contrast to the explicit reference to the named character "me" from whose point of view the logical expression in being evaluated from. The important point about referring to an object implicitly is that its identity is not necessarily known. For example, determining the nearest enemy character might involve iterating through the list of characters in the game, rejecting the ones that are not enemies of the "me" character and sorting the remainder according to distance to that "me" character.

To determine the truth or falsity of a logical expression that contains an implicit reference to some object, it is often unnecessary to explicitly determine the identity of the object referred to. For example, we know the logical expression "the world's tallest woman is mortal" is a true without necessarily knowing the identity of the world's tallest woman. However, the inventors have discovered that the identity of implicit references is often important in the actions that are contingent on logical expressions. For example, if upon inferring that the world's tallest woman is mortal you wished to send her a card to express your condolences, it would not be enough to simply know she existed. You'd need to also know her identity, not to mention her mailing address.

In one preferred embodiment, if a test like "the nearest enemy character is dangerous" turns out to be true, then the identity of that character is usually important. In particular, a character deciding what to do next might want to know the identity of the character so that it knows who to run away from. The inventors therefore refer to determining the identity of such implicit references as determining targets. The world "target" is used because the corresponding object is often the target of a subsequent action. For example, the target could be the target of an attack, the target to run toward, the target to run away from, etc.

Of course, it is possible that there is no target. For example, all the enemies may have already been vanquished or perhaps they are simply so far away that they are to be ignored. In such cases, there would be no corresponding nearest enemy object. Any contingent tests are vacuously false and there is no object to act as the target of some action. In such situations, the inventors have discovered it is useful to have characters execute some other behavior that depends on another target or on no target at all. For example, wandering around randomly is an action that typically requires no target.

Now it is supposed that there is another target besides the nearest blue enemy character. For example, the nearest enemy character that is blue and holding a sword. If we remembered the list of blue enemy characters we can potentially speed up the search for the identity of the nearest blue character that is additionally holding a sword. In particular, we need only search through the list of blue characters and not the entire list of characters. In general, by structuring the searches like this from least restrictive to most restrictive, the inventors have discovered significant speed boosts can be obtained in determining targets. Even when the tests are not simple inclusions, the tests for different targets can be arranged in a tree so that common sub-portions of tests can take advantage of previous calculations of less restrictive sub-portions of other tests.

FIGS. 20-24 show a set of example feature trees that are used to determine targets in a video game application developed by the inventors. The trees are evaluated in ostensibly the same way as the feature trees for evaluating logical expressions. One minor difference is that when evaluating targets, walking the tree can be short-circuited in the event that a target is found.

The inventors have found that in many cases a single character fulfills the role of many different targets and that the computation is extremely fast.

Hardware Implementation

While one preferred embodiment is implemented in software, it is obviously possible to create hardware for evaluating a set of fixed feature trees. However, there are other known methods for quickly evaluating a set of logical expressions in hardware that do not use the invention. Instead they take advantage of the inherently parallel nature of computation is an electric circuit. Implementing a set of feature trees in hardware may, however, result in an equivalent circuit that uses less gates and hence less power.

The invention claimed is:

1. A computing device for rapidly evaluating logical expressions, the computing device comprising:
   a memory space for storing code;
   a processor, coupled to the memory space, executing the code to cause the computing device to perform operations of:
      obtaining a set of logical expressions, at least some of the logical expressions associated with a time sequence, each of the logical expressions associated with one or more primitives that at any time have one or more possible values, wherein the logical expressions are expressed in one or more directed acyclic graphs, each including at least one root node, at least one leaf node, and at least one association between a non-leaf node and a leaf node, node is associated with a set of the logical expressions that are presumed true, a subset of true logical expressions being a possibly empty subset the logical expressions, and each non-leaf node is further associated with one of the primitives associated with one of these logical expressions; and each edge between any two nodes is associated with one of the primitive associated with a node at a tail of the edge, and at any time, a path through each of the directed acyclic graphs from a root node is determined by recursively following the edge that corresponds to the value of the primitive at a given non-leaf node; and
      taking a union of the logical expressions expressed in the directed acyclic graphs and traversing the directed acyclic graphs to yields the subset of the true logical expressions.

2. A computing device as in claim 1, further comprising a cache of the value of at least one primitive, the value having been determined at a node visited as part of traversing through at least some of the acyclic graphs and made available to determine the edge to follow for a subsequent node visited and associated with the primitive.

3. A computing device as in claim 2, further comprising a cache of the value of at least one primitive that is retained even after the subset of true logical expressions has been determined so that the value of at least one primitive facilitates a calculation of a different subset of true logical expressions later.

4. A computing device as in claims 1, 2 or 3, wherein the subset of true logical expressions is determined with a maximum number of times the primitives are evaluated, the maximum number is less than or equal to a total number of the directed acyclic graphs.

5. A computing device as in claim 4, wherein the subset of true logical expressions is determined in real time or near real-time.

6. A computing device as in claim 4, wherein the subset of true logical expressions is determined with any primitive being evaluated at most once.

7. A computing device as in claim 4, wherein the subset of true logical expressions is determined in time that is typically logarithmic, but at least sub-linear, in the number of logical expressions.

8. A computing device as in claim 1, wherein the computing device is executing a video game, the computing device is configured to facilitate real-time or near real-time decision making in accordance with the subset of the true logical expressions.

9. A computing device as in claim 8, wherein the computing device facilitates real-time or near real-time learning in accordance with the logical expressions.

10. A computing device as in claim 9, wherein the set of logical expressions is a set of tests from a collection of specialists, a set of true tests is a subset of the tests that determine a set of active experts, wherein each of the specialists is an expert paired with one of the tests such that whenever the one of the tests is determined to be true, the expert is said to be active, wherein the expert is a subroutine to be queried to suggest a particular action, behavior or course of action in video game.

11. A computing device as in claim 10, wherein the logical expressions are about a member of the group comprising:
    a portion of a real world;
    all or a portion of an abstraction of the real world;
    a portion of a virtual world; and
    all or a portion of an abstraction of the virtual world.

12. A computing device as in claim 1, further comprising converting each of the logical expressions a disjunctive normal form (DNF).

13. A computing device as in claim 12, wherein the primitives are used in a video game to indicate a set of surrounding parameters or a status of an object, the set of surrounding parameters includes, what other objects are near the object, and the status includes at least a health level of the object.

14. A computing device as in claim 11, wherein at least one of those logical expressions is a member of a group comprising:
    a statement about a state of a real world, or a portion thereof;
    a statement about a state of an abstraction of the real world, or a portion thereof;
    a statement about a state of a virtual world, or a portion thereof;
    a statement about a state of an abstraction of some virtual world, or a portion thereof;
    a statement about a state of an object represented within the real world, or a portion thereof;
    a statement about a state of the object represented within the abstraction of the real word, or a portion thereof;
    a statement about a relationship between a first object represented within the real world, or a portion thereof, and a second object represented within the real world, or a portion thereof;
    a statement about a relationship between the first object represented within the abstraction of the real world, or a portion thereof, and a second object represented within the abstraction of the real world, or a portion thereof; or
    a statement asserted to be a combination, conjunction, or disjunction of one or more of the above.

15. A computing device as in claim 14, wherein
    the computing device facilitates decision making and/or learning in robotics applications.

16. A computing device as in claim 14, wherein the computing device facilitates decision making and/or learning in OLAP applications.

17. A method for rapidly evaluating logical expressions, the method comprising:
    maintaining data in a memory space representing a set of logical expressions, at least some of the logical expressions associated with a time sequence, each of the logical expressions associated with one or more primitives that at any time have one of one or more values; and operating a computing device to read one or more directed acyclic graphs, each including at least one root node, at least one leaf node, and at least one association between a non-leaf node and a leaf node, wherein each node is associated with a set of the logical expressions that are presumed true, the set of true logical expressions being a possibly empty subset of the logical expressions, and each non-leaf node is further associated with one of the primitives associated with one of the logical expressions, each edge between any two nodes is associated with one of values of the primitives associated with the node at a tail of an edge, at any time, a path through each of the directed acyclic graphs from a root node is determined by recursively following the edge that corresponds to one of the values of the primitives at a given non-leaf node; and taking a union of the logical expressions expressed in the directed acyclic graphs and traversing the directed acyclic graphs to yield the subset of the true logical expressions.

18. A method as in claim 17, further comprising caching a value of at least one primitive, the value having been determined at a node visited as part of traversing the path through at least one of the acyclic graphs and made available to determine the edge to follow for a subsequent node visited and associated with the same primitive.

19. A method as in claim 18, further comprising retaining a cache of at least one primitive even after the subset of true logical expressions has been determined.

20. A method as in claim 17, further comprising determining the subset of true logical expressions, with a maximum number of times a primitive is evaluated, the maximum number being less than or equal to a number of the directed acyclic graphs.

21. A method as in claim 20, further comprising determining the subset of true logical expressions in real time or near real-time.

22. A method as in claim 20, further comprising determining the subset of true logical expressions with a primitive being evaluated at most once.

23. A method as in claim 20, further comprising determining the subset of true logical expressions in an amount of time that is logarithmic in a number of the logical expressions.

24. A method as in claim 20, further comprising determining the subset of true logical expressions in an amount of time that is sub-linear in the number of logical expressions.

25. A method as in claim 21, further comprising decision making in real-time or near real-time.

26. A method as in claim 21, further comprising learning in real-time or near real-time.

27. A method as in claim 21, further comprising setting the set of logical expressions be a set of tests from a collection of specialists and a subset of true tests determined a set of active experts, wherein each of the specialists is an expert paired with one of the tests such that whenever the one of the tests is determined to be true, the expert is said to be active, wherein the expert is a subroutine to be queried to suggest a particular action, behavior or course of action in video game.

28. A method as in claim 17, wherein the logical expressions are about a member of a group comprising:
a portion of a real world;
all or a portion of an abstraction of the real world;
all or a portion of a virtual world; and
all or a portion of an abstraction of the virtual world.

29. A method as in claim 28, wherein at least one of the logical expressions is a member of the group comprising:
a statement about some state of the real world, or a portion thereof;
a statement about some state of an abstraction of the real world, or a portion thereof;
a statement about some state of the virtual world, or a portion thereof;
a statement about some state of an abstraction of the virtual world, or a portion thereof;
a statement about some state of an object represented within the real world, or a portion thereof;
a statement about some state of an object represented within the abstraction of the real world, or a portion thereof;
a statement about some relationship between a first object represented within the real world, or a portion thereof, and a second object represented within the real world, or a portion thereof;
a statement about some relationship between a first object represented within the world abstraction, or a portion thereof, and a second object represented within the world abstraction, or a portion thereof; and
a statement asserted to be a combination, conjunction, or disjunction of one or more of the above.

30. A method as in claim 29, further comprising decision making and/or learning in robotics applications.

31. A method as in claim 29, further comprising decision making and/or learning in OLAP applications.

32. A method as in claim 29, further comprising decision making and/or learning in video game applications.

33. A software product in a computer readable medium for rapidly evaluating logical expressions, the software product comprising:

program code for obtaining a set of logical expressions to facilitate making a decision in a video game, at least some of the logical expressions associated with a time sequence, each of the logical expressions associated with one or more primitives that at any time have one or more possible values, wherein the logical expressions are expressed in one or more directed acyclic graphs, each including at least one root node, at least one leaf node, and at least an association between a non-leaf node and a leaf node, each node is associated with a set of the logical expressions that are presumed true, a subset of true logical expressions being an empty subset the logical expressions, and each non-leaf node is further associated with one of the primitives associated with one of the logical expressions; and each edge between any two nodes is associated with one of the primitives associated with a node at a tail of the edge, and at any time, a path through each of the directed acyclic graphs from a root node is determined by recursively following the edge that corresponds to a value of one of the primitives at a given non-leaf node; and program code for taking a union of the logical expressions expressed in the directed acyclic graphs and traversing the directed acyclic graphs to yield the subset of the true logical expressions.

34. The software product as recited in claim 33, wherein the decision making includes context learning used to learn a play style of a human player.

35. The software product as recited in claim 34, wherein one or more of the logical expressions define a set of input features to a machine learning algorithm, the each of the logical expression is constructed from logical connectives, relational operators, parentheses and the primitives, where truth or falsity of each of the logical expressions is determined by current values of the primitives and standard rules of mathematical logic, the primitive values change over time.

* * * * *